(12) United States Patent
Lemonovich et al.

(10) Patent No.: US 7,850,127 B2
(45) Date of Patent: Dec. 14, 2010

(54) CAB SIGNAL RECEIVER DEMODULATOR EMPLOYING REDUNDANT, DIVERSE FIELD PROGRAMMABLE GATE ARRAYS

(75) Inventors: John E. Lemonovich, Coraopolis, PA (US); William A. Sharp, Cranberry Township, PA (US); James C. Werner, Oakmont, PA (US); Zhu Ding, Marshall Township, PA (US); Sean P. Berecek, Aspinwall, PA (US)

(73) Assignee: Ansaldo STS USA, Inc., Pittsburgh, PA (US)

( * ) Notice: Subject to any disclaimer, the term of this patent is extended or adjusted under 35 U.S.C. 154(b) by 401 days.

(21) Appl. No.: 12/131,381

(22) Filed: Jun. 2, 2008

(65) Prior Publication Data
US 2009/0230255 A1  Sep. 17, 2009

Related U.S. Application Data

(60) Provisional application No. 61/035,396, filed on Mar. 11, 2008.

(51) Int. Cl.
*G06F 11/00* (2006.01)
(52) U.S. Cl. .................. 246/1 C; 246/167 R; 714/10; 714/11; 714/12
(58) Field of Classification Search .............. 246/1 R, 246/1 C, 3, 4, 5, 15, 62, 63 R, 63 C, 63 A, 246/167 R, 182 R, 186, 187 R; 714/10, 11, 714/12, 13; 701/19, 20, 31, 33, 39, 43, 62, 701/76, 92, 97; 700/82, 108; 376/215; 326/37, 326/38, 39, 41, 45, 47, 24, 34
See application file for complete search history.

(56) References Cited

U.S. PATENT DOCUMENTS

| | | | |
|---|---|---|---|
| 4,279,395 A | 7/1981 | Boggio et al. | |
| 4,437,056 A | 3/1984 | Pierro, Jr. | |
| 5,330,134 A | 7/1994 | Ehrlich | |
| 5,340,062 A | 8/1994 | Heggestad | |
| 5,358,202 A | 10/1994 | Tse et al. | |
| 5,711,497 A | 1/1998 | Andrianos et al. | |
| 5,785,283 A | 7/1998 | Ehrenberger et al. | |
| 5,984,504 A | 11/1999 | Doyle et al. | |
| 5,995,881 A | 11/1999 | Kull | |
| 6,363,464 B1 * | 3/2002 | Mangione | 711/167 |
| 6,592,081 B2 | 7/2003 | Yerge | |
| 6,763,290 B2 | 7/2004 | Johnson | |
| 6,845,467 B1 * | 1/2005 | Ditner et al. | 714/11 |
| 6,928,583 B2 * | 8/2005 | Griffin et al. | 714/11 |
| 7,064,579 B2 | 6/2006 | Madurawe | |
| 7,120,824 B2 * | 10/2006 | Burton et al. | 714/6 |
| 7,392,426 B2 * | 6/2008 | Wolfe et al. | 714/11 |
| 7,673,188 B2 * | 3/2010 | Choate et al. | 714/45 |
| 2002/0039368 A1 | 4/2002 | Musoll et al. | |

\* cited by examiner

*Primary Examiner*—Mark T Le
(74) *Attorney, Agent, or Firm*—Eckert Seamans Cherin & Mellott, LLC; Kirk D. Houser, Esq.

(57) ABSTRACT

A processor includes a first field programmable gate array (FPGA) having a first central processing unit (CPU) core programmed to perform a first function, and first programmable hardware logics (PHLs) programmed to perform a second function. A second FPGA includes a second CPU core programmed to perform a third function, and second PHLs programmed to perform a fourth function. A communication interface is between the first and second CPU cores. The first and second FPGAs are diverse. A portion of the first function communicates first information from the first CPU core to the second CPU core through the interface. A portion of the third function communicates second information from the second CPU core to the first CPU core through the interface, and, otherwise, the first function is substantially the same as the third function. The second function is substantially the same as the fourth function.

26 Claims, 17 Drawing Sheets

CAB SIGNAL RECEIVER DEMODULATOR EMPLOYING REDUNDANT, DIVERSE FIELD PROGRAMMABLE GATE ARRAYS

CROSS-REFERENCE TO RELATED APPLICATION

This application claims the benefit of U.S. Provisional Patent Application Ser. No. 61/035,396, filed Mar. 11, 2008.

BACKGROUND OF THE INVENTION

1. Field of the Invention

This invention pertains generally to cab signal apparatus and, more particularly, to railroad vehicle cab signal apparatus. The invention also pertains to processors including redundant field programmable gate arrays.

2. Background Information

In railroad transportation systems, it is often desirable to transmit information to a railroad vehicle by the use of cab signaling. The information desired to be transmitted is encoded into a track signal current, which is transmitted to the railroad vehicle through the rails. When the track signal current reaches the vehicle, the signal information may be detected and the information utilized on-board the vehicle.

Some of the cab signal information transmitted may be of a nature that is desirable to be known by those on-board the railroad vehicle and/or may be information which is redundant with wayside signaling information. However, in some instances, it may be desirable that the cab signal information transmits track signal aspects, such as speed commands, to the vehicle, which are vital to the operation of the vehicle, along with track conditions that affect the operation of the vehicle. For example, four track signal aspects may be transmitted by the cab signal and each track signal aspect may have an associated maximum speed at which a train may travel into the next block. For example, the four track signal aspects may be "clear", "approach-medium", "approach" and "restricting".

This information can be received by the railroad vehicle through an antenna usually positioned in front of the lead axle, which is inductively coupled to the cab signal current that is in the rail in front of the lead axle. The lead axle tends to act as a shunt between the rails and, therefore, the positioning of the cab signal antenna or inductive coupling is usually done in close proximity to, but in front of the lead axle. Other cab signal pick-up systems may also be utilized.

Some cab signal carrier frequencies of the rail current can be at frequencies of 60 Hz and 100 Hz, although a wide range of other suitable frequencies may be employed. Changes from existing cab signal carrier frequencies on projects require the hardware design of a new filter printed circuit board (PCB) for each new carrier. This can be a laborious process, which includes designing, prototyping, testing, verifying and releasing a new filter PCB for each new project that requires a new carrier frequency.

In addition to a filter, a conventional cab signal apparatus also includes a demodulator connected to the filter for receiving an output signal and retrieving a code signal from a cab signal component thereof. The code signal includes cab signal aspects for assisting with the operation of the railroad vehicle. Also, a decoder is connected to the demodulator to generate a track aspect signal corresponding to the code signal received from the demodulator.

All new projects that have new aspect definitions (e.g., carrier modulation rates) require application software changes to a decoder PCB. Furthermore, such software requires testing, verification and validation before being released to program and install one or more programmable memory components on the decoder PCB.

Historically, the use of programmable logic devices (e.g., Complex Programmable Logic Devices (CPLD) and Field Programmable Gate Arrays (FPGAs)) has not been present in safety-critical designs due to low confidence in the performance of the devices as a result of the lack of a method to formally verify that the devices are working as designed and implemented. Hence, FPGAs are believed to be relatively new to safety critical systems.

U.S. Pat. No. 5,984,504 discloses in its Background Information that instrumentation and control systems utilize diverse redundant primary and backup control mechanisms, in which the processors and/or the software utilized therein are different, in order to preclude common mode failures. In the case of control mechanisms incorporating digital processors, different types of processors (e.g., from different manufacturers) are used to run different routines (e.g., implemented in different software languages) implementing common algorithms.

U.S. Pat. No. 5,984,504 also discloses a protection subsystem employing diverse processors to protect a critical process, such as a nuclear reactor pressure vessel. The critical process has one or more characteristics, such as conditions of the pressure vessel and a plurality of parameters, such as temperature and level, each of which is representative of a characteristic. A first processor and a corresponding first parameter are substantially different from a second processor and a corresponding second parameter. The diverse processors employ different respective parameters and substantially different mechanisms to provide similar respective protection outputs, which are redundant relative to the characteristic. In this manner, a variety of common mode failures between the redundant processors are obviated. Voting mechanisms combine the processor outputs to effect a safety or protection function, such as integrated protection logic for a nuclear reactor trip.

Although diverse redundant control mechanisms are known, further improvements are possible.

There is room for improvement in railroad vehicle cab signal apparatus.

There is also room for improvement in processors including field programmable gate arrays.

SUMMARY OF THE INVENTION

These needs and others are met by embodiments of the invention, which provide a processor and a cab signal apparatus in which a first field programmable gate array includes a first central processing unit core programmed to perform a first function, and first programmable hardware logics programmed to perform a second function. A second field programmable gate array includes a second central processing unit core programmed to perform a third function, and second programmable hardware logics programmed to perform a fourth function. A communication interface is between the first and second central processing unit cores. The first and second field programmable gate arrays are preferably diverse.

As one aspect of the invention, a processor comprises: a first field programmable gate array comprising: a first central processing unit core programmed to perform a first function, and first programmable hardware logics programmed to perform a second function; and a second field programmable gate array comprising: a second central processing unit core programmed to perform a third function, and second programmable hardware logics programmed to perform a fourth function; and a communication interface between the first and second central processing unit cores, wherein the second field programmable gate array is diverse with respect to the first field programmable gate array, wherein a portion of the first function is structured to communicate first information from the first central processing unit core to the second central processing unit core through the communication interface, wherein a portion of the third function is structured to communicate second information from the second central processing unit core to the first central processing unit core through the communication interface, and, otherwise, the first function is substantially the same as the third function, and wherein the second function is substantially the same as the fourth function.

The second central processing unit core may be diverse with respect to the first central processing unit core.

The first central processing unit core may be a first soft IP core central processing unit; and the second central processing unit core may be a second soft IP core central processing unit.

As another aspect of the invention, a cab signal apparatus for a railroad vehicle comprises: a first sub-system comprising: a first receiver structured to receive a plurality of track signals, a first field programmable gate array cooperating with the first receiver, the first field programmable gate array comprising: a first central processing unit core programmed to input, demodulate and decode the track signals to provide a first number of track signal aspects, first programmable hardware logics programmed to perform a first function, and a first communication interface cooperating with the first central processing unit core to communicate the first number of track signal aspects to a first device external to the cab signal apparatus; a second sub-system comprising: a second receiver structured to receive the plurality of track signals, a second field programmable gate array cooperating with the second receiver, the second field programmable gate array comprising: a second central processing unit core programmed to input, demodulate and decode the track signals to provide a second number of track signal aspects, second programmable hardware logics programmed to perform a second function, and a second communication interface cooperating with the second central processing unit core to communicate the second number of track signal aspects to a second device external to the cab signal apparatus; and a third communication interface between the first and second central processing unit cores, wherein the second field programmable gate array is diverse with respect to the first field programmable gate array, wherein the first central processing unit core is further programmed to communicate the first number of track signal aspects from the first central processing unit core to the second central processing unit core through the third communication interface, wherein the second central processing unit core is further programmed to communicate the second number of track signal aspects from the second central processing unit core to the first central processing unit core through the third communication interface, and wherein the first function is substantially the same as the second function.

The second central processing unit core may be diverse with respect to the first central processing unit core.

The first central processing unit core may be a first soft IP core central processing unit; and the second central processing unit core may be a second soft IP core central processing unit.

The first communication interface may comprise a first dual port memory having a first port and a second port, and a second dual port memory having a first port and a second port, the first port of the first dual port memory being readable by the first central processing unit core, the first port of the second dual port memory being writable by the first central processing unit core; the portion of the first function may be further structured to control the first and second dual port memories; the second communication interface may comprise a third dual port memory having a first port and a second port, and a fourth dual port memory having a first port and a second port, the first port of the third dual port memory being readable by the second central processing unit, the first port of the fourth dual port memory being writable by the second central processing unit core; the portion of the second function may be further structured to control the third and fourth dual port memories, to read the second number of track signal aspects from the second port of the fourth dual port memory and communicate the second number of track signal aspects to the third communication interface, and to communicate the first number of track signal aspects from the third communication interface and write the first number of track signal aspects to the second port of the third dual port memory; and the portion of the first function may be further structured to read the first number of track signal aspects from the second port of the second dual port memory and communicate the first number of track signal aspects to the third communication interface, and to communicate the second number of track signal aspects from the third communication interface and write the second number of track signal aspects to the second port of the first dual port memory.

The third communication interface may be structured to electrically isolate the first sub-system from the second sub-system.

The first communication interface may comprise a dual port memory having a first port and a second port; and the first port of the dual port memory may be accessible by the first central processing unit core; the portion of the first function may be further structured to control the dual port memory, to read the first number of track signal aspects from the second port of the dual port memory, and to serially communicate the first number of track signal aspects to the first device external to the cab signal apparatus.

The first central processing unit core may be further programmed to compare the first number of track signal aspects from the first central processing unit core to the second number of track signal aspects from the second central processing unit core, and to select the more restrictive of the first number of track signal aspects and the second number of track signal aspects; and the first communication interface may be structured to communicate the more restrictive of the first number of track signal aspects and the second number of track signal aspects to the first device external to the cab signal apparatus.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
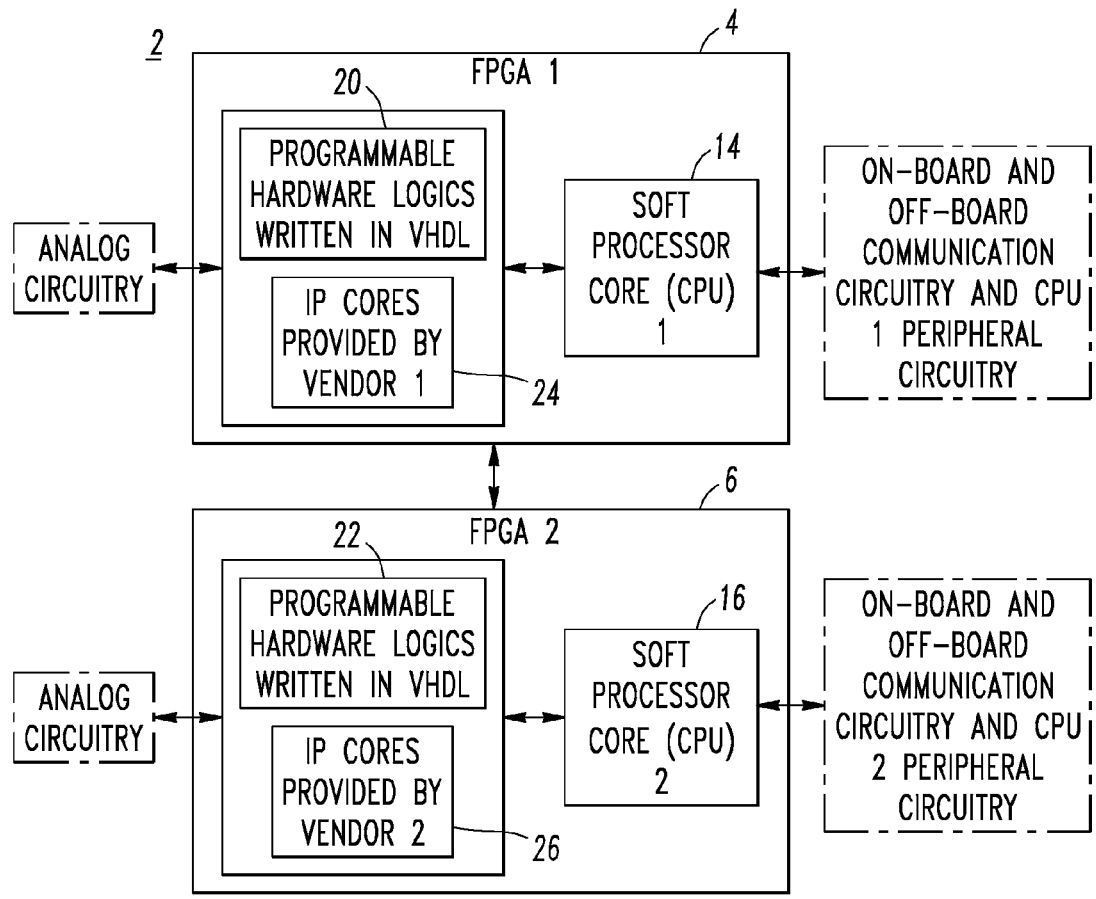
FIG. 1 is a block diagram in schematic form of a diverse Field Programmable Gate Array (FPGA) sub-system in accordance with embodiments of the invention.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit (CPU); a mainframe computer; a mini-computer; a server; a networked processor; an on-board computer; or any suitable processing device or apparatus.

As employed herein, the term "vital" or "vitally" means that the acceptable probability of a hazardous event resulting from an abnormal outcome associated with a corresponding activity or thing is less than about $10^{-9}$/hour. Alternatively, the mean time between hazardous events is greater than $10^9$ hours. Static data used by vital routines (algorithms), including, for example, routines dealing with track signal aspects, have been validated by a suitably rigorous process under the supervision of suitably responsible parties.

As employed herein, the terms "railroad" or "railroad service" mean freight trains or freight rail service, passenger trains or passenger rail service, transit rail service, and commuter railroad traffic, commuter trains or commuter rail service.

As employed herein, the term "railroad vehicle" means freight trains, passenger trains, transit trains and commuter trains, or a number of cars of such trains or of a railroad consist.

As employed herein, the terms "carborne" and "carborne equipment" refer to things or equipment on-board a railroad vehicle.

As employed herein, the term "IP core" means a semiconductor intellectual property (IP) core, IP block or other reusable unit of logic, cell or chip layout design. IP cores can be used as building blocks within application-specific integrated circuit (ASIC) or FPGA logic designs. IP cores can include digital logic, analog and/or analog/digital logic applications. Soft IP cores permit customer modifications, while hard IP cores do not permit their application function to be meaningfully modified.

As employed herein, the term "field programmable gate array" or "FPGA" means a semiconductor device containing programmable logic components, such as logic blocks, and programmable interconnects therebetween. Logic blocks can be programmed to perform the function of basic logic gates (e.g., without limitation, AND; OR; XOR; NOT) or relatively more complex combinational functions (e.g., without limitation, decoders; relatively simple mathematical functions; IP cores; central processing units). The FPGA logic blocks may also include volatile and/or non-volatile memory elements. A hierarchy of programmable interconnects allows logic blocks to be interconnected and programmed after the FPGA is manufactured to implement any logical function.

As employed herein, the term "diverse" means composed of distinct or unlike elements or qualities. For example, an FPGA made by one vendor (e.g., without limitation; Altera Corporation) is diverse from a different FPGA made by a different vendor (e.g., without limitation, Xilinx; Inc.). However, a processor made by one vendor (e.g., an 8086 made by Intel®) is not diverse from a plug-compatible, second source processor made by a different vendor (e.g., an 8086 made by AMD®).

The invention is described in association with an automatic train protection system for a railroad vehicle, although the invention is applicable to a wide range of systems, such as external cab systems or SPI masters, which use cab signal information or track signal aspects. The disclosed cab signal receiver demodulator (CSRD) provides a combination of vital cab signal aspect data and non-vital cab signal properties such as period, amplitude and duty cycle. This data can be accessed by any equipment that can provide an SPI master interface. This CSRD data is employed by an automatic train protection system, although it can be used, either vitally or non-vitally, by any equipment in which this data is desired.

Figure 4:
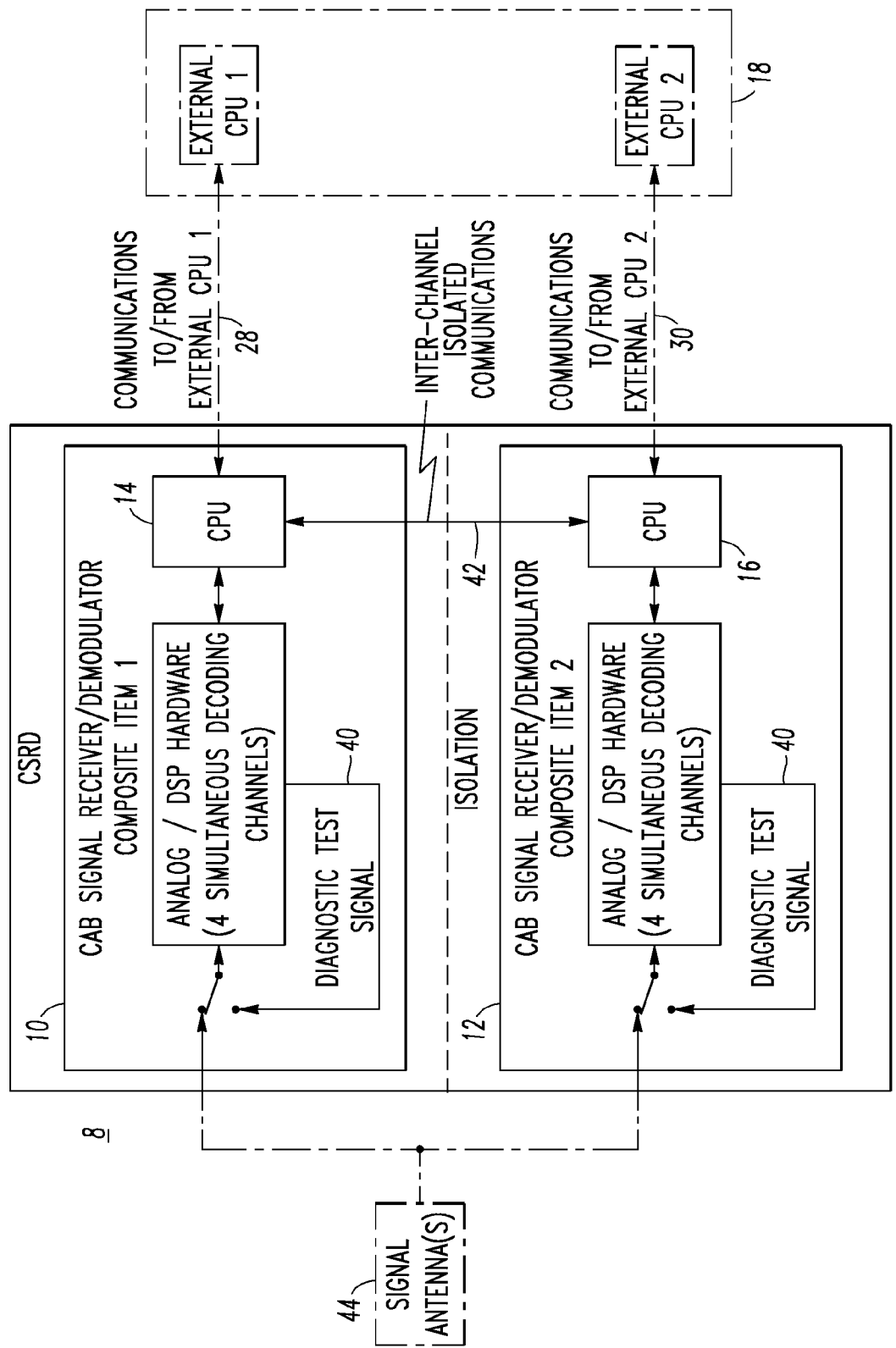
FIG. 4 is a block diagram in schematic form of a cab signal receiver demodulator in accordance with embodiments of the invention.

Referring to FIG. 1, a diverse Field Programmable Gate Array (FPGA) two-out-of-two architecture 2 employs two diverse FPGAs 4,6 in a vital application with maximum flexibility and safety. In order to compensate for uncertainty when using this FPGA technology, a two-out-of-two voting architecture makes use of the diverse FPGAs 4,6 in, for example, a Cab Signal Receiver Demodulator (CSRD) 8 (FIG. 4). The CSRD 8 includes two isolated composite items 10,12, each of which includes a different diverse FPGA 4,6 and a different corresponding soft-core processor 14,16, respectively, to implement the functions of the CSRD 8. These two parallel paths individually process received cab signal information, compare the results, and then provide the aspect information to an automatic train protection (ATP) system 18.

This architecture 2 provides a maximum Safety Integrity Level (i.e., SIL-4, in which, for example, a probability of failure on demand is about $10^{-5}$ to $10^{-4}$) in a quantitative failure analysis for a safety critical design. The components in a programmable hardware system can be classified into three categories: (1) programmable hardware logics 20,22 written in Very-High-Speed Integrated Circuits (VHSIC) hardware description language (VHDL) (e.g., a commonly used design-entry language for FPGAs and application-specific integrated circuits (ASICs) in electronic design automation of digital circuits); (2) IP cores 24,26 provided by diverse FPGA vendors; and (3) diverse soft-core processors, such as 14,16. By developing programmable logic using CENELEC (the European Committee for Electrotechnical Standardization)

SIL-4 techniques combined with a diverse and redundant architecture, the CSRD 8 is sufficiently protected from both systematic and random common-mode faults. This takes full advantage of the capabilities that programmable devices, such as FPGAs, have to offer in safety critical applications, such as the CSRD 8.

For the programmable hardware logics, such as 20,22, written in VHDL, it is not possible to quantify a systematic fault by quantitative analysis. Therefore, the CSRD 8 preferably complies with the standard EN50128 (Railway applications. Communications, signaling and processing systems. Software for railway control and protection systems) to ensure a qualitative approach. Also, the diverse IP cores 24,26 are provided by different vendors, although these implement the same or similar functions. In this manner, a systematic fault can be prevented. The implementation of the diverse soft-core processors 14,16 helps to reduce the risks associated with die changes and obsolescence. Similar to the diverse IP cores 24,26, two diverse function-identical processors 14,16 add redundancy to the CSRD 8 to prevent a systematic fault. In both instances, diversity protects against systematic faults and, also, random common-mode faults. The results generated by the two soft-core processors 14,16 are cross-checked and matched results are declared as being valid.

In the example CSRD 8, to compensate for uncertainty when using FPGAs, a two-out-of-two voting architecture (FIG. 9) is provided with the diverse FPGAs 4,6. The CSRD 8 (FIG. 4) employs two isolated composite circuits 10,12, each of which includes a different diverse FPGA 4,6 (FIG. 1) and a diverse corresponding soft-core processor 14,16 to implement the functions of the CSRD 8. As will be discussed, these two parallel paths individually process received cab signal information, compare the results, and then provide the aspect information to the ATP system 18 (FIG. 4). The CSRD 8 preferably employs light-weight, inter-composite communication, in order that results can be exchanged and compared quickly and easily between the two isolated composite circuits 10,12. The final result to the ATP 18 is preferably transmitted using a Serial Peripheral Interface (SPI) Bus communication link (or SPI link) 28,30. Also, an FPGA-based SPI memory share interface 32 (FIGS. 5B and 12) is preferably implemented between the diverse FPGAs 4,6 to simplify SPI data transmission.

Figure 2:
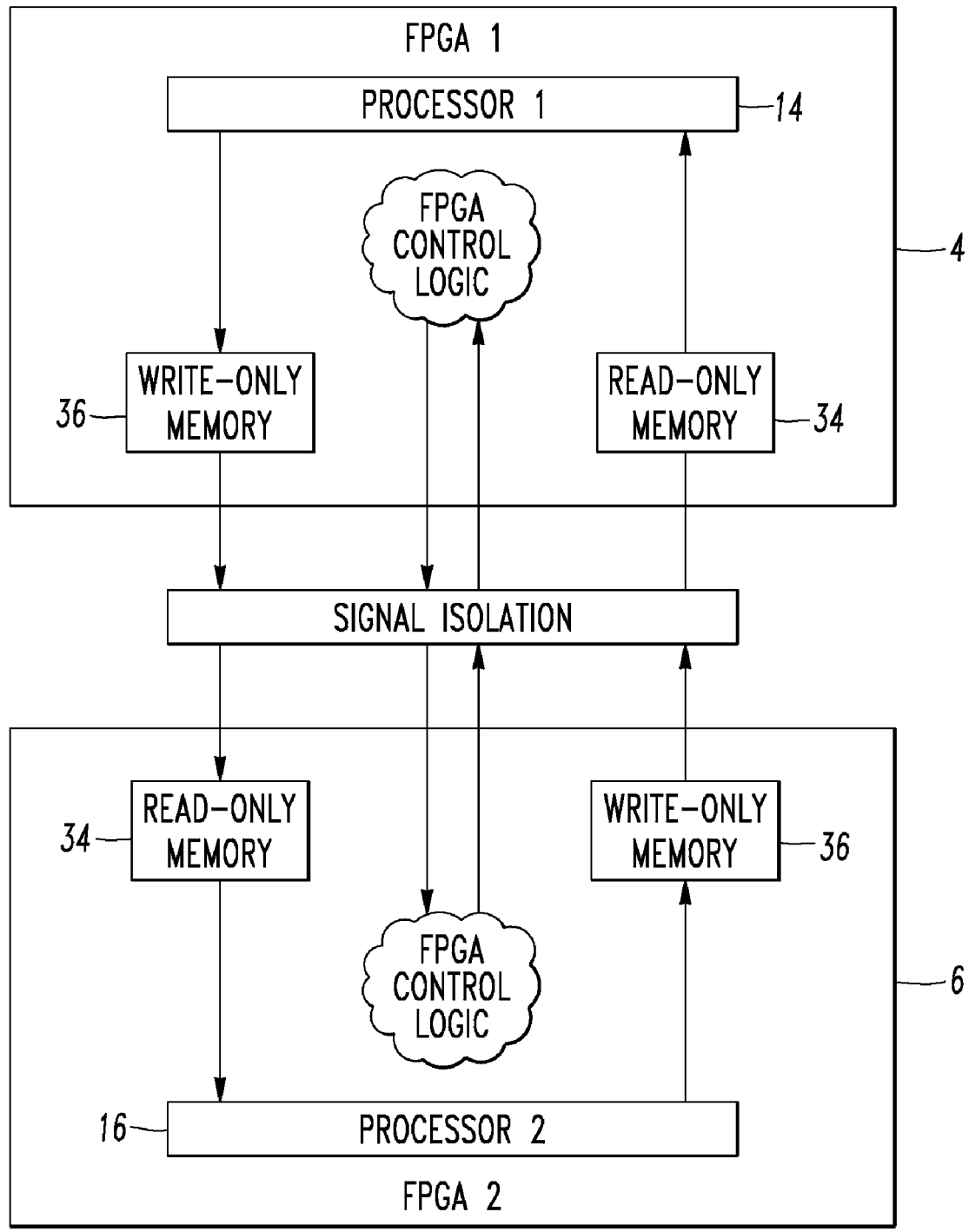
FIG. 2 is a block diagram in schematic form of two diverse composite items of FIG. 1 and the communications therebetween.
Figure 12:
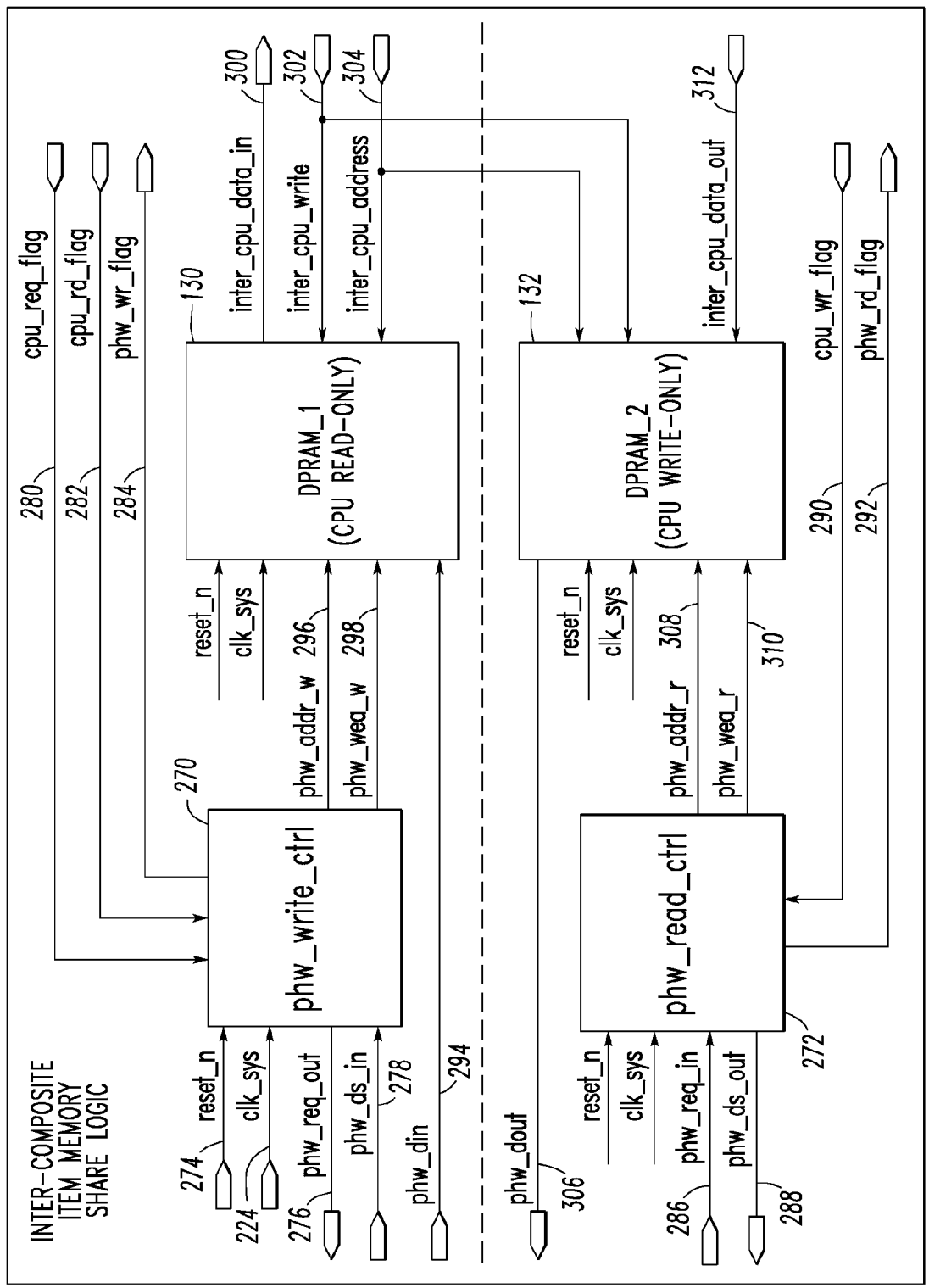
FIG. 12 is a block diagram in schematic form of the inter-composite item memory share logic of FIG. 5B.

FIG. 2 shows light-weight inter-composite communication between the soft-core processors 14,16. Each soft-core processor 14,16 interfaces with two tightly coupled internal memories 34,36, one memory 34 is processor read-only and other memory 36 is processor write-only. The processor write-only memory 36 allows the local processor 14,16 to write data. The local processor read-only memory 34 is synchronized with the other composite item write-only memory 36. In this manner, a data read from the local processor read-only memory 34 is the data written by the other composite item processor 14,16. All the data synchronization is done by FPGA control logic (FIG. 12). Using this approach, the software interface between the composite items 10,12 (FIG. 4) is as simple as reads from and writes to memory 34,36.

The advantages of the disclosed light-weight inter-composite communication include: (1) relatively small hardware logics are employed with, for example, less than about 1% additional FPGA logic utilization (e.g., without limitation, the FPGA control logic 32 employs 85 logic slices while the entire FPGA device (e.g., without limitation, Virtex4LX25) contains 10,752 total logic slices); (2) software 64 (FIG. 5) of the CPUs 14,16 employs generic memory read and write functions to access the local processor read-only and write-only memories 34,36, and data synchronization between the soft-core processors 14,16 employs minimum software processing; and (3) a typical data transmission speed is about 136 Mb/S with about 2500 $V_{RMS}$ isolation. This provides a reliable and high-speed communication interface that allows for the comparison of redundant results without the introduction of excessive processing latency.

Figure 3:
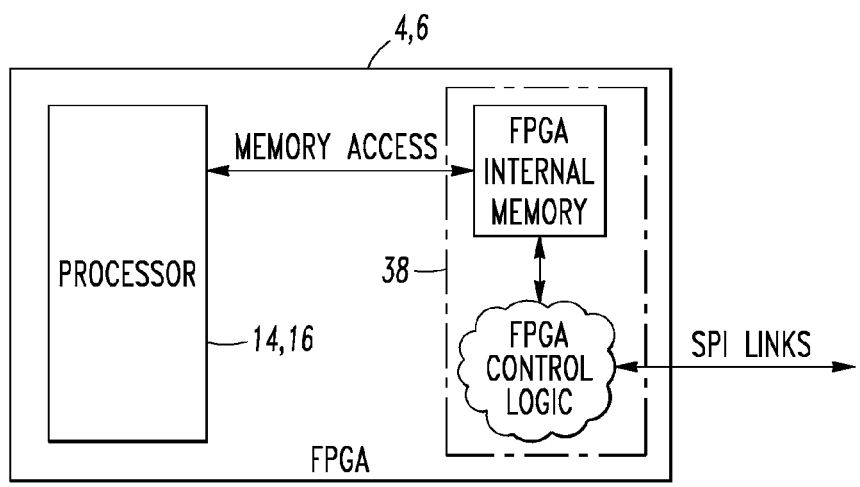
FIG. 3 is a block diagram in schematic form of an external communication interface of one of the diverse composite items of FIG. 1.

Referring to FIG. 3, the CSRD 8 (FIG. 4) includes an interface 38 implemented in the FPGA 4,6 that enables it to be treated by an SPI master, such as the ATP 18 (or other external cab equipment) (FIG. 4), as being an SPI slave. The software 64 (FIG. 5) employs general memory read and write operations to perform communication with the ATP 18, instead of handling an SPI communication protocol, which can be processor intensive. Also, by functioning as an SPI slave, the CSRD 8 can be used with any cab equipment that includes a configurable SPI master. The benefits of the FPGA-implemented SPI interface 38 include: (1) providing a standard SPI slave protocol; and (2) the software 64 of the CPUs 14,16 uses generic memory read and write operations to complete SPI communication without handling an SPI protocol.

Referring to FIG. 4, the CSRD 8 is shown including two composite items 10,12. Composite fail-safety is realized to address random faults and to ensure system safety in the event of any type of single random fault, which is recognized as possible.

The CSRD 8 preferably generates all detected types of cab signals for use in safety self-checking and system verification testing. Each composite item 10,12 configures the characteristics of a test signal 40 (e.g., modulation type; frequencies; level; message) for the other composite item 12,10 through an inter-channel communication link 42. The fault detection time is the interval of test (e.g., once every 24 hours in the example embodiment). The test signal 40 is injected by taking the composite item 10,12 "off-line" and switching out the antenna(s) 44. The ATP 18 runs this test (FIG. 7) only when cab signal detection is not required (e.g., when the train is stopped and off-line running system-wide diagnostic tests; when the train controls and propulsion systems are turned off).

The CSRD 8 preferably creates test AF-90X FSK track signals with selectable digital data, signal level, and mark and space frequencies. These parameters are selectable both within the criteria of an acceptable AF-90X signal, and outside the criteria with bad data, low signal level or frequencies out of tolerance range.

The CSRD 8 preferably creates a test MC cab signal with selectable level, frequency, period and duty-cycle. Dual carrier signals are selectable, though simultaneous generation of both carriers is not employed. The level, frequency, period and duty-cycle are all selectable within and outside of the criteria parameters for the aspects that are configured for detection.

The CSRD 8 preferably creates test steady carrier signals with selectable level and duration. The level and duration are selectable within and outside of the criteria for the declaration of steady carrier.

The CSRD 8 preferably creates test impulse response system (IRS) signals with selectable level and period. The level and period are selectable within and outside of the criteria parameters for the aspects that are configured for detection.

The CSRD 8 provides various example interfaces. When referencing an interface as being "internal" or "external", this refers to the interface as being internal or external to the CSRD 8. When referencing a "hardware-to-software interface", this refers to an interface from the software 64 (FIG. 5) of the CPU 14,16 to the hardware and/or to the programmable hardware.

The test signal interface 46 (FIG. 8) is an internal hardware-to-software interface that configures all facets of the diagnostic test signal 40.

The level detection interface (not shown) is an internal hardware-to-software interface that provides in-band level (amplitude) information from the four decoding channels.

The DSP-filter interface (not shown) is an internal hardware-to-software interface that configures all facets of the digital filters (e.g., filter corner frequencies; filter phase response; magnitude response).

The DSP-demodulator interface (not shown) is an internal hardware-to-software interface that configures all facets of the demodulation process (e.g., detection parameters; logic thresholds). This interface also provides the software with the decoded digital data transitions and associated timestamps.

The DSP-analog-to-digital interface (not shown) is an internal hardware-to-software interface that configures analog and analog-to-digital hardware for receiving and digitizing track signals.

The inter-channel communications interface 32 (FIG. 5B) is an internal composite item-to-composite item interface that provides for software and hardware inter-channel communications between the two composite items.

The LEDs interface 48 (FIG. 5B) is a user interface that provides software and hardware controlled LEDs (not shown).

The external debugging interface 50 (FIG. 5B) is an external interface for CPU debugging and debugging/control of programmable hardware.

The external communications interface 52 (FIG. 5B) is an external interface for off-board communications to the ATP 18 (FIG. 4). This may include one or more interface types (e.g., SPI; RS-485).

Figure 5A:
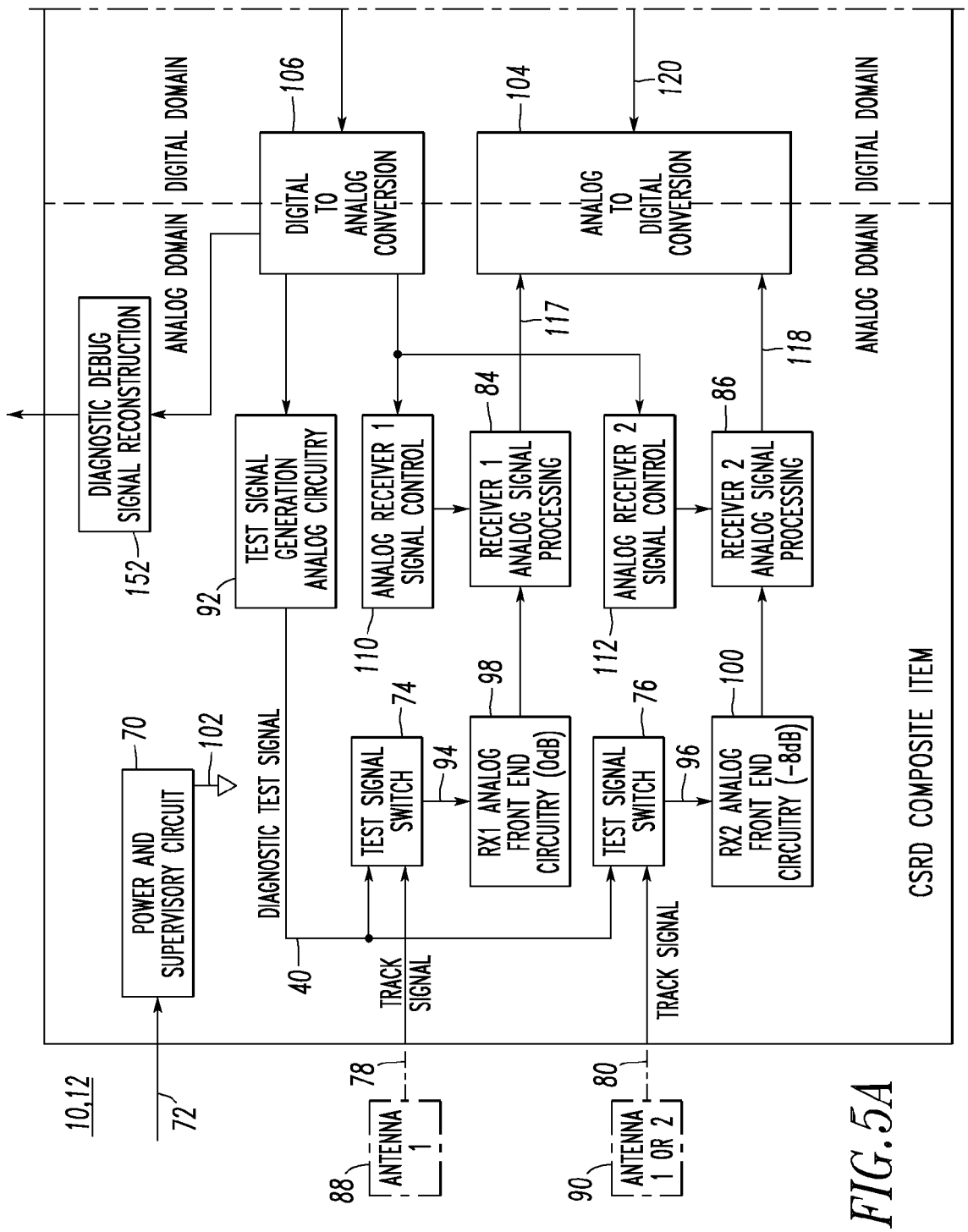
FIGS. 5A-5B form a block diagram in schematic form of one of the composite items of FIG. 4.
Figure 5B:
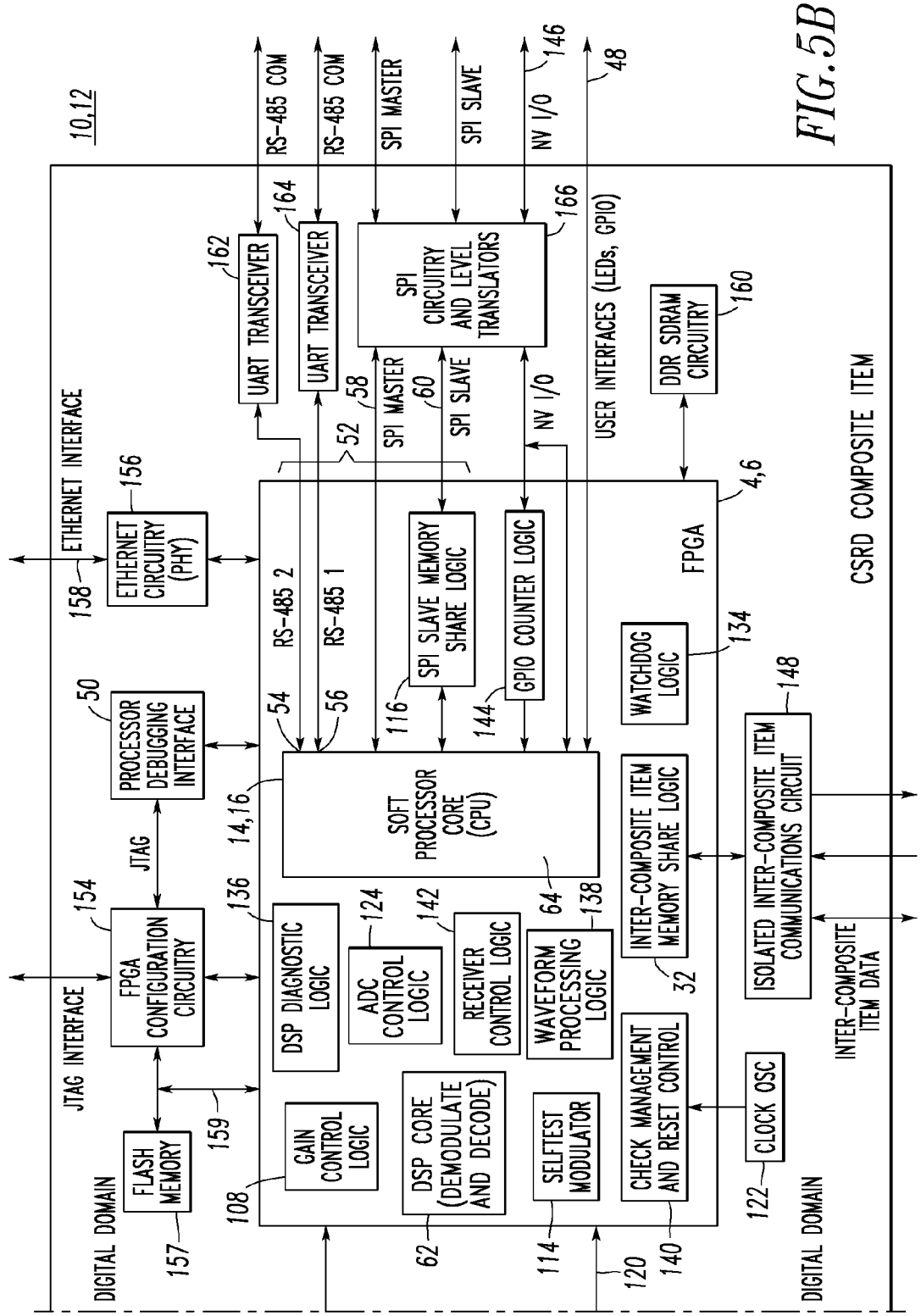

As shown in FIGS. 5A-5B, the CSRD 8 is a highly configurable microprocessor-based signaling subsystem. The CSRD 8 is a stand-alone and multi-purpose receiver that can be configured to receive and demodulate, for example, AF-90X FSK track circuit signals, modulated carrier (MC) cab signals (e.g., single and dual carrier), steady carrier track signals (or constant carrier (CC) cab signals), and impulse track signals (or impulse response system (IRS) cab signals). The CSRD 8 simultaneously decodes up to four carrier frequencies, which allows it to be configured for multiple combinations of signal types. The CSRD 8 also provides communication to external cab equipment by providing RS-485 54,56 and other high-speed SPI links 58,60.

The decoded cab signal information is available via serial communication to other cab equipment for use in ATP or control. The CSRD 8 can be used in many signal processing applications employing filtering, demodulation and decoding of cab signals, or in other signaling applications employing signal processing and decoding. The CSRD 8 uses DSP hardware technology 62 coupled with configurable software 64 to effectively provide cab signal filter and decoder CPU/FSK functions. The CSRD 8 is designated at Safety Integrity Level 4 (SIL-4) and, therefore, communicates fail-safe vital decoded signaling information to the ATP 18 (FIG. 4). The fail-safe architecture is one of composite fail-safety, implying that each safety related function is performed by more than one item (redundancy). In the case of the CSRD 8, two composite items 10,12 (FIG. 4) together form a vital sub-system. This ensures system safety in the event of any type of single random fault, which is recognized as possible. Since it is not feasible to quantify systematic faults by quantitative analysis, all software 64 of the CPUs 14,16 and/or programmable hardware of the FPGAs 4,6 preferably adhere to EN 50128 to ensure a qualitative approach according to the respective software or programmable hardware level (SIL-4). For example, composite fail-safety is realized to address random faults and to ensure system safety in the event of any type of single random fault, which is recognized as possible.

The CSRD 8 can simultaneously detect and decode up to four carrier frequencies allowing it to be configured for multiple combinations of track signal types. This configuration is available via communication with external cab signal equipment at start-up. Table 1 shows the capabilities of simultaneous decoding channel configurations.

TABLE 1

| Decoding Channel 1 | Decoding Channel 2 | Decoding Channel 3 | Decoding Channel 4 |
| --- | --- | --- | --- |
| FSK Mark 0 | FSK Space 0 | FSK Mark 1 | FSK Space 1 |
| MC/CC/Impulse | MC/CC/Impulse | MC/CC/Impulse | MC/CC/Impulse |
| Dual MC - f0 | Dual MC - f1 | Dual MC - f2 | Dual MC - f3 |
| Dual MC - f0 | Dual MC - f1 | MC/CC/Impulse | MC/CC/Impulse |
| Dual Carrier | Dual Carrier | Modulate/Steady/Impulse | Modulate/Steady/Impulse |

When referring to the four "decoding channels", even though each composite item 10,12 contains the same four functional decoding channels, this does not mean that there are eight simultaneous channels. The first composite item 10 contains four decoding channels, and likewise the second composite item 12 contains four decoding channels that together provide four channels of vital information. Therefore, when referencing one of the four decoding channels of one composite item 10,12, it can be considered simply redundant in the other composite item 12,10.

When configured to decode an AF-90X FSK track signal, the CSRD 8 uses two of its four available decoding channels for each FSK carrier (mark or space). Since AF-90X track signaling employs simultaneous decoding of the "current" and "next" carrier frequencies, the CSRD 8 uses four of the four available decoding channels. The CSRD 8 monitors for FSK signal, recovers the digital data contained within the signal, and decodes any valid AF-90X data message from the raw data. In addition to FSK data, the signal amplitude level is also detected, providing for bond-crossing detection. The data message and signal level are made available via the communication links 28,30 to the ATP system 18 (FIG. 4).

When configured to decode a modulated carrier type cab signal, the CSRD 8 uses one of its four available decoding channels per carrier frequency. The CSRD 8 is therefore capable of receiving and decoding four modulated carriers simultaneously. The CSRD 8 monitors for MC signal and determines the level, period and duty cycle. When configured for a dual carrier MC signal, the phase relationship between the two carrier modulation rates is also determined.

The CSRD 8 declares a cab aspect based on the detection of an MC signal that meets all defined criteria. This criteria includes, but is not limited to, minimum level, allowable period and duty cycle, number of valid periods before declaration, and hold-time of aspect if the signal is no longer detected. In the case of dual carrier MC signals, the allowable phase relationship between the two-carrier modulation rate is also defined. The aspect criteria is definable by external cab equipment via the communication links 28,30 (FIG. 4). The declared aspect and all determined MC signal characteristics are made available by the CSRD 8 to the ATP 18 via the communication links 28,30.

When configured to decode constant carrier track signals, the CSRD 8 uses one of its four available decoding channels per carrier frequency. The CSRD 8 monitors for steady carrier signal and determines the level and duration of the signal. The CSRD 8 declares detection of the constant carrier signal when all defined criteria are met. This criteria includes, but is not limited to, minimum level, minimum duration and the hold-time of the declaration after a signal is no longer detected. The declaration criteria is definable by the ATP 18 via the communication links 28,30. The detection declaration and all determined steady carrier signal characteristics are made available by the CSRD 8 to the ATP 18 via the communication links 28,30.

When configured to decode an impulse cab signal, the CSRD 8 uses one of its four available decoding channels. The CSRD 8 monitors for impulse detection and determines the pulse level, pulse width, and the period between pulses. The CSRD 8 declares a cab aspect based on the detection of an impulse signal that meets all defined criteria. This criteria includes, but is not limited to, minimum level, allowable period between pulses, number of valid periods before declaration, and hold-time of aspect if the signal is no longer detected. The aspect criteria is definable by the ATP 18 via the communication links 28,30. The declared aspect and all determined impulse signal characteristics are made available by the CSRD 8 to the ATP equipment 18 via the communication links 28,30.

Communication to the ATP 18 is provided by the CSRD 8 via an RS-485 serial link 54,56 (FIG. 5) or other suitable high-speed SPI link 58,60 (FIG. 5). In both cases, the CSRD 8 acts as a slave on the link and responds only if requested. All data on the communication links 28,30 (FIG. 4) is vital and is protected and checked with, for example, a suitable CRC.

FIGS. 5A-5B show one of the two CSRD composite items 10,12, it being understood that the other diverse CSRD composite item 12,10 (redundant item) is identical, although it incorporates a diverse FPGA 6,4. For the composite items implemented by identical VHDL code, the VHDL programming preferably strictly adheres to EN50128 to ensure a qualitative approach according to the respective programmable hardware component SIL level. The systematic fault of those components is eliminated by using diverse synthesis and place and route development tools. Using different development tools, the same VHDL code may lead to different netlists and definitely different gate level implementations on the diverse FPGAs 4,6.

For example, place and route is done by an Altera QuartusII development tool (synthesis tools plus place and route tools) for an Altera composite item, and is done by a Xilinx ISE development tool (synthesis tools plus place and route tools) for a Xilinx composite item. The VHDL file is first synthesized to diverse netlists by the diverse synthesis tools, and the diverse netlists are placed and routed as different gates targeted on diverse FPGA logic cells (logic elements).

Custom embedded peripherals are preferably done by adding register interfaces to custom logics. The custom logics are almost identical between the two composite items 10,12. The register interfaces are adjusted for different CPU (e.g., without limitation, MicroBlaze™ CPU; NIOS® II CPU) bus signals.

The power and supervisory circuit 70 provides for protection on DC input voltages 72 from outside sources and for distributing/generating/monitoring DC power. This circuit 70 generates local power for the digital and analog circuits and monitors this local power for degradation. For example, if power degradation exceeds a predetermined amount, then a RESET output (not shown) is asserted to cause the CSRD 8 to asynchronously clear all outputs to default states. The RESET output can also be asserted responsive to a front panel reset pushbutton (not shown).

The test signal switch 74,76 switches in/out the antenna track signal 78,80/diagnostic test signal 40. The test signal switch 74,76 is controlled by the opposing composite item 12,10. Although the switch 74,76 is controlled by the opposing composite item 12,10, the control is indirect. The opposing composite item 12,10 sends the switch setting information as a message via the inter-composite item memory share logic 32. The local CPU 14,16 receives the message and then sets up the test signal switch 74,76 on the local composite item 10,12. This control is implemented in order that the CPU 14,16 for the composite item 10,12 under test may not be aware that it is under test by the other composite item 12,10. This gains independence between the "checker" and the item being "checked". The test signal switch 74,76 inputs a track signal 78,80 from the corresponding antenna 88,90, respectively, and a diagnostic sinusoidal test signal 40 from the test signal generation analog circuit 92. The test signal switch 74,76 outputs a single analog output 94,96 containing either the track signal data 78,80 from the antenna 88,90, respectively, or the diagnostic test signal 40.

The RX1 and RX2 analog front end circuitry 98,100 provides for the initial analog receiver differential input and front-end signal protection. The protection circuitry withstands continuous signals in excess of about 150 Vpp and for ESD immunity. These circuits 98,100 receive either the test signal 40 or the "real" antenna track signal 78,80 from the test signal switch 74,76 and reference that signal to a corresponding ground 102. In the example embodiment, there are two differences between the analog receivers 84,86: (1) the second receiver 86 has an initial differential attenuation of −8 dB (a linear gain of 0.4) for added dynamic input range in detecting high-energy track circuits; and (2) the first receiver 84 has a selectable preamp of 6 dB for added gain prior to the variable gain amplifier (VGA) (not shown). This may be used, for example, in an application, such as FSK, for relatively very weak signals.

The analog signal processing 84,86 provides analog signal processing functions before analog-to-digital conversion: (1) gain control; and (2) anti-aliasing. Gain control is employed to achieve a minimum signal-to-noise ratio and appropriate signal level at the corresponding analog-to-digital converter (ADC) (not shown) of ADC conversion circuit 104, in order that such filtering and demodulation can be reliably performed at various track circuit currents, as received from various antennas 88,90. Preferably, the CSRD 8 supports a relatively wide frequency and amplitude range and, if so, then a suitably wide dynamic range from the analog signal processing 84,86 is needed. Since the FPGA 4,6 provides a sampled DSP function, good anti-aliasing is also needed before the ADC provides the analog-to-digital conversion. When applied with a suitable anti-alias cutoff-to-sample rate ratio, this ensures that unwanted or "phantom" signals do not appear by signals that are under-sampled per the Nyquist criterion. A programmable anti-alias filter (not shown) is preferred, such that sample rate and receiver bandwidth are configurable functions.

Amplitude control of the incoming signal 78,80 is achieved using one of two techniques: (1) fixed gain control (FGC); and (2) automatic gain control (AGC). Amplitude control using AGC is preferred to minimize the quantization distortion and maximize the available headroom of the analog-todigital conversion of the circuit 104. Using AGC allows the CSRD 8 to abstract the antenna characteristics and minimum track circuit currents, since the AGC control loop will constantly servo to lock onto any signal that may be present. AGC also lends itself to ease of demodulation, since a fixed digital threshold may be used while maintaining a very accurate duty cycle detection. This makes systems engineering easier by not considering, for example, antenna source impedance, minimum track current and relatively complicated detector parameters. However, running AGC makes it relatively difficult to determine the level of the in-band filtered signal, since the control in the continuous-time analog domain is ahead of the digital filters by the phase response and variable group delay. To worsen the problem, at relatively very low frequencies, the group delay is a relatively large percentage of the modulation rate.

For these reasons, a fixed-gain may be more desirable to systems where the in-band signal level information must be quantified for comparison to calibration levels as a vital function. Using FGC lends itself to accurately calculating the level of the in-band filtered signal with the trade-off being additional detector parameters and systems engineering for determining, for example, the gain setpoint and the minimum level.

Since there are systems that can benefit from either of the two techniques, the ability to run AGC or FGC is implemented by the CSRD 8. The gain control mechanism is a VGA (not shown) that is controlled by a digital-to-analog converter (DAC) of the digital-to-analog conversion circuit 106 that is coupled to the gain control FPGA logic 108. When under FGC, the CPU 14,16 can set the fixed-gain discrete value to the DAC-controlled VGA stage, to hold a steady gain. In AGC mode, the FPGA gain control logic 108 adaptively servos the envelope of the incoming received signal to a setpoint programmed by the CPU 14,16, using a proportional/integral/derivative (PID) loop and the DAC-controlled VGA stage.

The anti-alias filter (not shown) is implemented as a clock frequency programmable switched-capacitor filter. This simplifies the receiver 84,86 by eliminating the necessity of having active filters switched in/out based on the slice of the frequency spectrum of interest. The switched-capacitor filter itself, however, is a sampled system, which suitably oversamples the signal. Also, a general purpose active continuous-time fourth order low pass filter with a relatively high corner frequency is used to attenuate switch-noise signals.

The analog receiver signal control 110,112 provides for routing of signals in the analog domain (receiver 84 only) and the VGA amplitude control signaling. Routing of signals is accomplished using discrete control signals to analog switches (e.g., a switch (not shown) in the pre-amp (not shown) for receiver 84). Amplitude control is accomplished using a DAC-controlled VGA (not shown). The DAC provides a bipolar DC control voltage to a VGA providing −20 dB to +35 dB of dynamic signal control of the input signal.

The test signal generation analog circuitry 92 generates the sinusoidal diagnostic safety test signal 40 with CPU-controlled variable volume control. The output of the selftest modulator 114 is processed by a two-channel high-speed DAC (not shown) of the circuit 106 where the first channel can be used to digitally synthesize the waveform and this output can be input to the voltage reference of the second channel, thereby making a precision volume control (e.g., amplitude control via four-quadrant multiplication). The resulting precision 20 Vpp test signal is then low pass filtered, such that the discrete-time sampled stair-step response of the digital waveform synthesis is attenuated. The corner frequency of this low pass filter is high enough such that the response of the filter is as flat as possible in the pass-band yet sufficiently removes the quantization distortion. An active filter using operational amplifiers is desired here as opposed to active filter integrated circuits.

The circuit 106 provides the physical DAC devices (not shown) and connectivity to the FPGA 4,6 for several functions. First, two diagnostic re-construction DACs (not shown) provide two unipolar DAC channels to simultaneously represent two channels (e.g., mark and space) of signal information. Analog representation of any digital filter tap point can then be reconstructed (e.g., mark and space band pass; mark and space low pass; mark/space absolute value (ABS); raw input). These DACs are controlled by the DSP diagnostic logic 136. Second, a diagnostic test signal DAC (not shown) is provided for an analog sinusoidal waveform synthesis using a dual channel high-speed current output DAC (not shown). One DAC output (not shown) is the full-scale test signal itself where the other (not shown) is the amplitude control. Third, a VGA control DAC (not shown) provides the control voltage for the VGA and, therefore, controls the amplitude range of the input signal (whether in FGC or AGC).

The analog-to-digital conversion circuit 104 provides the physical ADC devices (not shown) and connectivity to the FPGA 4,6 for digitizing the signals after the anti-alias filters within the two analog receivers 84,86. The ADC (not shown) for the signal information is chosen such that the conversion rate is at least two times the Nyquist frequency of the highest frequency of interest. A 14-bit ADC (not shown) provides sufficient resolution and high enough signal-to-noise ratio to filter, demodulate and recover data. This ADC samples and provides data in from the two receivers 84,86 in parallel (e.g., up to 400,000 samples per second for a maximum input signal of about 150 kHz). These ADCs input the analog anti-aliased signal 117,118 from receivers 84,86 (amplitude controlled) and output the digitized discrete-time signals 120 for receivers 84,86 containing either the diagnostic test signal, or track information such as MC, FSK, impulse, or constant carrier.

The clock oscillator 122 provides the clock source to the FPGA 4,6 and its internal logic. From this clock source, three clocks (not shown) are derived inside the FPGA. The system clock clk_sys 224 (FIGS. 11 and 12) may be divided down internally for other variable rate clocks (not shown) (e.g., switched-capacitor filter frequency is derived by counting down the system clock; an NCO core clock for generating numerical samples for frequency synthesis; a DDR SDRAM clock which is the same clock as the system clock with the exception of a compensated phase shift).

The FPGA 4,6 provides the core functionality and control for the CSRD 8. The FPGA 4,6 includes a soft processor core 14,16 that runs application specific software 64 controlling filtering and demodulation, and communications to the host CPU (e.g., ATP 18 (FIG. 4)). The various FPGA core components are discussed, below.

The digital signal processing (DSP) core 62 implements a digital filter, a demodulator and a detector that is capable of filtering and demodulating MC, CC, FSK, or impulse type track signals. The DSP core 62 is interfaced to the CPU 14,16 for controlling the filtering and demodulation process by setting parameters (e.g., filter coefficients; detector logical thresholds). The DSP core 62 also provides the CPU 14,16 with the decoded digital data and associated timestamp information and status information (e.g., carrier status; low SNR detected). A non-limiting example of a cab signal filter and demodulator using a DSP is disclosed by U.S. Pat. No. 5,711,497, which is incorporated by reference herein.

The selftest modulator 114 generates a modulated test signal sinusoidal waveform for all of the detected track signal types (e.g., MC; CC; FSK; impulse) and precisely adjusts the volume (amplitude control) of the test signal 40.

The ADC control logic 124 acquires data from the two analog receiver ADCs (not shown) of the circuit 104, and interfaces to the ADC devices (not shown) of the circuit 104 and the associated electrical timing. The digitizing rate is a variable rate set by the CPU 14,16. The output of each acquisition is registered and signaled as ready to downstream logic.

The gain control logic 108 runs in two modes: AGC or FGC. This includes a DAC controller (not shown) that interfaces to the DAC devices (not shown) of the circuit 106 and associated electrical timing and incorporates a gain control mechanism (not shown) for controlling the gain in the analog receivers 84,86 and a PID controller (not shown) for running in the AGC mode. A corresponding CPU interface (not shown) sets up the gain control process.

The soft processor core (CPU) 14,16 runs application specific software 64 and controls the CSRD 8. The CPU 14,16 controls inter-composite item communications, off-board communications and all application level tasks. The CPU 14,16 accepts a wide range of configuration items (e.g., hold and drop time; aspect definitions; signal determination routines).

The SPI slave memory share logic 116 functions, for example, as a SPI slave to the host ATP 18 (FIG. 4) (or as an RS-485 slave to external cab equipment (not shown)) for a memory share function. The memory share logic 116 provides semaphore control of the shared resources, de-serializes the data into a dual-ported random access memory (DPRAM) 128 (FIG. 11) for the CPU 14,16, and clock domain crossing (signal hardening) with the ATP 18.

The inter-composite item memory share logic 32 acts as a memory share function between inter-composite items 10,12 (e.g., without limitation, Altera® FPGA 4 and Xilinx® FPGA 6). The memory share logic 32 provides for semaphore control, synchronous high-speed data transfer into DPRAMs 130,132 (FIG. 12) for the CPU 14,16, and clock domain crossing (signal hardening) between the clock domains.

The watchdog logic 134 provides a watchdog reset function with the CPU 14,16. The software 64 refreshes the watchdog logic 134 within a specified window to determine health. If the watchdog logic 134 is not refreshed within the specified window, then the CPU 14,16 is reset.

The DSP diagnostic logic 136 provides "eyes" into the digital filter domain. The user can select (e.g., using DIP switches (not shown); a soft CPU register (not shown)) any two signals to monitor within the digital filter domain. This DSP diagnostic logic 136 synthesizes the waveform by controlling the external DAC devices (not shown) of the circuit 106 and associated timing.

The waveform processing logic 138 provides the CPU 14,16 with the level of the in-band signal for each of the four filter chains. A level detector (not shown) is implemented as a peak detect function providing the CPU 14,16 with the peak since last read cycle, until the CPU 14,16 resets the peak. The waveform processing logic 138 also provides the CPU 14,16 with the instantaneous level value for reading and evaluation at any time.

The clock management and reset control 140 provides the FPGA 4,6 with several clocks. A reset control function combines any source that can reset the CPU 14,16 (e.g.; the watchdog logic 134; a PCB level reset) and preferably provides a synchronized transition to a non-reset state.

The receiver control logic 142 controls the two analog receivers 84,86. The two switched-capacitor frequencies are generated based on CPU-selection of the frequencies. This receiver control logic 142 also controls signal routing through the receivers 84,86 (e.g., pre-amp select in receiver 84; test signal injection control).

The general purpose I/O (GPIO) counter logic 144 provides counter logic for use with the general purpose inputs 146. This logic allows for the GPIO counter logic 144 to be used to count pulses when an input 146 is used to monitor the output of a tachometer (not shown).

The isolated inter-composite item communications circuit 148 facilitates cross-composite item isolated high-speed communication. This circuit 148 includes four control signals, eight data out signals (to the other composite item 12,10), and eight data in signals (from the other composite item 12,10) to/from the FPGA 4,6. These are incorporated through high-speed isolation buffers 150 (FIG. 17) to communicate with the other FPGA 6,4 on a separate ground plane. The electrical interface combined with the FPGA circuit 148, as a whole, acts as a memory share. The FPGA circuit 148 handles all control and data serializing/de-serializing to/from the other composite item 12,10. Since the interface appears to both soft processors 14,16 as being a DPRAM and the CPUs 14,16 are un-synchronized, the FPGA circuit 148 handles semaphores for multiple access, clock domain crossing, and DPRAM interfacing.

The diagnostic debug signal reconstruction 152 is implemented as "eyes" into the digital filter domain. Two DAC channels (not shown) are instrumented to simultaneously represent two channels (mark and space) of filter chain signal information. The output waveform of the diagnostic DACs is first low pass filtered (LPF) to eliminate the stair-step response common in digitally representing an analog signal. The LPF is realized through a dual second order (fourth order) continuous time filter integrated circuit (IC) (not shown) programmed with a corner frequency of approximately 120 kHz. Using −24 dB/octave, this is a low enough corner frequency to sufficiently attenuate the step function output of the DAC while passing all pertinent filter information in the range of frequency interest. Switches (not shown) select the signals to output to the DAC channels for debugging purposes.

The FPGA configuration circuitry 154 provides for configuring the FPGA's SRAM cells (not shown) upon power on reset (POR). The configuration process upon POR is accomplished using a suitable complex programmable logic device (CPLD) (not shown) that accesses the flash memory devices 157 and serially shifts data into the FPGA 4,6. The CPLD uses a state machine to read the flash memory 157 sequentially and write the configuration data to the FPGA 4,6. This configuration process is protected with a 32-bit CRC. If the CRC fails, then the FPGA 4,6 tristates all I/O and asserts an error signal to the CPLD.

The processor debugging interface 50 provides for debugging of the FPGA 4,6 and the CPU 14,16. This allows for gate-level signal monitoring and background operation of the CPU 14,16 including, for example, trace, go, stop and break.

The Ethernet circuitry (PHY) 156 provides for high-speed downloading of FPGA configuration data, application CPU code (s-records), or general flash event data. A boot program (not shown) may also be used to issue debugging commands to dump memory or write to a block of RAM (not shown). When the CSRD 8 is completely blank from manufacturing, the boot program and initial FPGA configuration are programmed into flash memory 157 via the processor debugging interface 50, in order that the FPGA 4,6 and boot program is initiated and automatically run upon POR. The boot program incorporates a TCP/IP stack (not shown) and handles communication to/from a LAN controller (not shown). The embedded LAN controller acquires an IP address using DHCP, or uses a static IP address so a personal computer (PC) (not shown) may recognize and connect to the CSRD 8 via the Ethernet link 158. After the connection is established, the PC-side application can transmit and receive data using the opened TCP/IP data socket. To process data to/from the embedded LAN controller, the FPGA 4,6 is configured with a valid configuration with the CPU 14,16 running the boot program with TCP/IP stack.

The flash memory 157 provides for electrical connectivity and interfacing from off chip flash memory to the embedded FPGA's CPU 14,16. The flash memory 157 is coupled to the FPGA's soft processor core 14,16 via a synchronous tristate bus 159.

The double data rate (DDR) synchronous dynamic random access memory (SDRAM) circuitry 160 provides for electrical connectivity and interfacing between the FPGA 14,16 and the DDR SDRAM thereof (not shown). To control the DDR SDRAM 160, a controller core (not shown) is incorporated within the FPGA 4,6. The FPGA DDR SDRAM controller provides for configuring the parameters (e.g., number of rows and columns; column address select (CAS) latency; burst length; refresh interval; precharge period; write recovery time) employed to interface with the DDR SDRAM 160.

The UART transceivers 162,164 provide for RS-485 communications for off-board short or long distance communications.

The SPI circuitry and level translators 166 provide high-speed off board serial communications. An SPI master, such as the example ATP 18 (FIG. 4), sources four chip selects (not shown) to control four peripherals (not shown) non-multiplexed or 15 devices (not shown) multiplexed. The SPI master serial clock (spis_clk 226) (FIG. 11) can be run at speeds up to 20 MHz. The SPI slave is seen by the off-board SPI master as being an SPI slave. However, on the CSRD-side, the SPI slave is incorporated into VHDL logic to act as an SPI slave to the off-board master, and interface to the DPRAM 128 (FIG. 11) internally. This allows the CPU 14,16 in the FPGA 4,6 to access the memory share as a straight DPRAM 128 while the SPI slave memory share logic 116 acts as an SPI slave to the off-board master. Level shifters translate to logic-level signals for off board signals and also translate the GPIO input and outputs to logic-level signals for off board signals.

Figure 6:
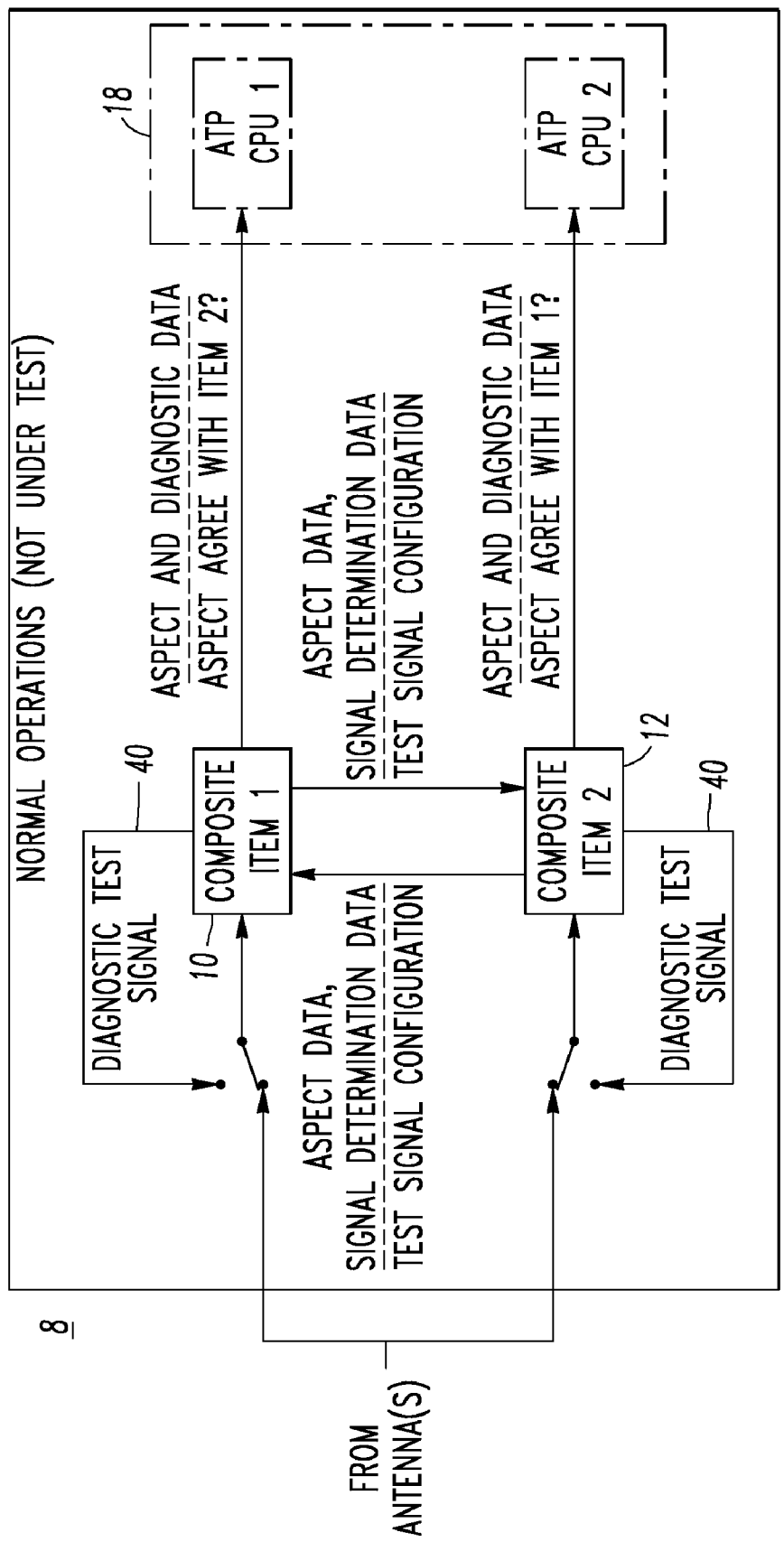
FIGS. 6-8 are block diagrams in schematic form of the cab signal receiver demodulator of FIG. 4.
Figure 7:
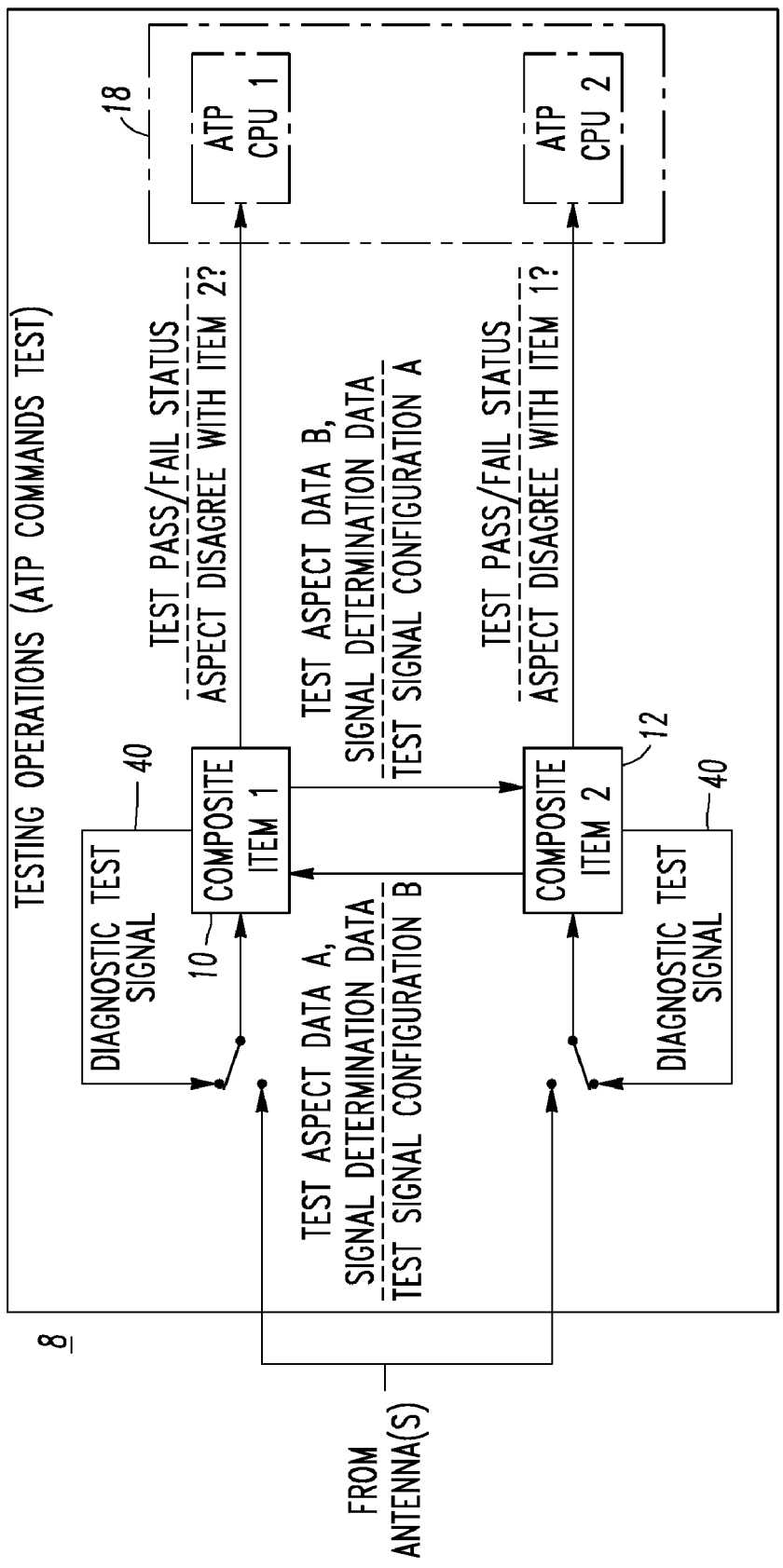

Referring to FIGS. 6 and 7, the operations of the CSRD 8 can be considered in two parts: (1) normal running operations; and (2) testing operations, respectively. In normal running operations (FIG. 6), the ATP 18 is simply comparing the aspects declared and whether the two composite items 10, 12 agree. Additionally, the ATP 18 is provided with signal determination data for diagnostic purposes only.

With regard to testing operations (FIG. 7), the ATP 18 commands initiation of the test to each composite item 10, 12. The ATP 18 then expects the disagreement between aspects declared and waits some reasonable time for the test pass/fail status. From the perspective of the CSRD 8, after a composite item 10,12 gets the message from the ATP 18 to run a test from a command from the ATP 18, that composite item 10, 12 waits a reasonable amount of time to receive the expected test results. The expected test results are the results that correspond to the test communicated to the opposing composite item's test signal logic. The test signal 40 is injected by taking the composite item "off-line" and switching out the antenna(s) 44 (FIG. 4).

Figure 8:
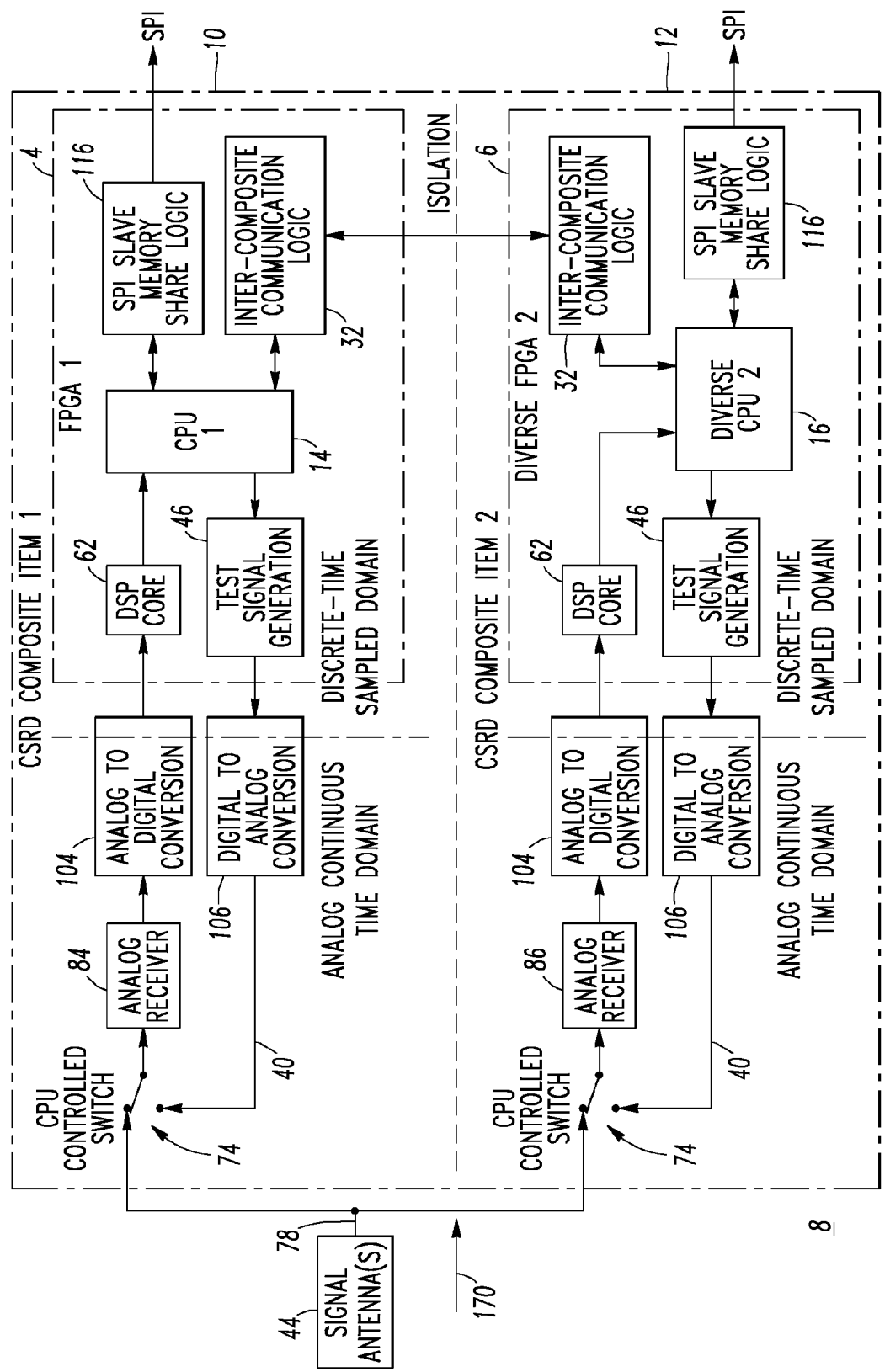

FIG. 8 shows another high-level block diagram of the CSRD 8. This will be discussed in terms of the main function blocks and, also, how the CSRD 8 generally processes the received cab signal information from a signal flow perspective.

The CSRD 8 includes the two diverse composite items 10,12. These composite items 10, 12 perform almost identical functions and are redundant to each other.

A number of signal antennas 44 (FIG. 4) receive analog signals that are injected into the rails (not shown) by the wayside equipment (not shown). For example and without limitation, each composite item 10, 12 is able to connect with up to two antennas to receive analog signals that are injected into the rails (not shown) by the wayside equipment (not shown). The CSRD 8 allows for the two receivers 84,86 in each composite item 10, 12 to share an antenna or they can use separate antennas. This option is preferably jumper configurable (not shown) on the CSRD 8. These signals include, but are not limited to, FSK, modulated carrier, steady carrier and impulse signals. The analog receiver 84,86 (FIG. 5) receives either a test signal 40 or the "real" antenna track signal 78 (FIG. 5) based upon the position of an analog switch 74 (FIG. 5) controlled by the CPU 14,16 (FIGS. 4 and 5). The analog receiver 84,86 provides suitable analog signal processing to clean, protect and scale the front-end signal.

The analog-to-digital conversion circuit 104 (FIG. 5) digitizes the received analog signal in the analog continuous-time domain from the analog receiver 84,86 (FIG. 5) to the discrete-time domain for DSP processing.

The digital-to-analog conversion circuit 106 converts digital signals from the FPGA 4,6 to analog signals for test signal generation. This circuit also uses a number of digital-to-analog converters (DACs) (not shown) for gain control of the received analog signal.

The digital signal processing (DSP) core 62 (FIG. 5) provides variable rate signal digitizing, digital filtering, demodulation and decoding of the detected signals over all ranges of detection, frequencies, amplitudes and modulation types. Preferably, the DSP core 62 can be dynamically configured for filter topology and response, sample rate, demodulation type, magnitude response and decoding sensitivity. The DSP core 62 also provides communications interfaces to/from the CPU software 64 (FIG. 5B) for configuration data and demodulated decoded track data.

The test signal generation circuit 46 (FIG. 8) generates the digitized sinusoidal diagnostic safety test signal 40 with CPU-controlled volume adjustment. The generated digital signals are converted to a self-test analog signal by the digital-to-analog conversion circuit 106.

The CPU 14,16 executes the CSRD software 64 (FIG. 5), and provides hardware and software interfaces to support interfaces with multiple FPGA components.

The SPI slave memory share logic 116 (FIG. 5) facilitates communications and data transfer between external equipment, such as the ATP 18, and the CSRD 8. This logic 116 is structured from the external side, such that the CSRD 8 appears to the external equipment as being an SPI Slave, while the logic itself appears to the CSRD soft-CPU 14,16 as being memory.

The inter-composite communication logic 32 (FIG. 5) provides fast and isolated data exchange to/from the other composite item 12,10 on the CSRD 8.

As shown in FIG. 8, an unconditioned cab signal 170 is injected as input into the CSRD 8 from the number of antennas 44. The signals, such as 170, may range from about 50 mVpp to about 150 Vpp and have a frequency range of DC to about 75 kHz. Analog circuitry (not shown) provides high voltage and ESD protection, programmable gain control and programmable anti-alias filtering. The resulting signal is converted from analog to digital and provided to the DSP core 62 of the FPGA 4,6. The DSP core 62 provides a programmable multi-stage digital filter (not shown) to reject signals outside of the desired cab signal carrier frequency band. The DSP core 62 then detects the existence of a carrier frequency from the filtered signal, determines the level of any detected carrier, and detects and stores a clock-based timestamp for every transition of the carrier state.

The carrier state (on or off), the carrier level, and carrier state transitions data (on-to-off and off-to-on timestamps) are passed to the soft-core CPU 14,16 of the FPGA 4,6. The CPU 14,16 calculates from this information signal characteristics (e.g., modulation state times and period; modulation duty cycle; number of modulation cycles detected and associated signal level). The CPU 14,16 compares these signal characteristics to programmable criteria for declaring vital CSRD determinations (e.g., cab-signal aspects; steady carrier declarations). As one non-limiting example, the CPU 14,16 declares a specific vital output state (aspect) when the signal detected has a modulation period between "x" and "y", a duty cycle between "a" and "b", a signal level greater than "z", and at least "n" periods of this signal have been detected with these characteristics. As another non-limiting example, an aspect ID of 3 may correspond to an ATP speed limit of 25 MPH. In order to declare this aspect, the CPU 14,16 may need to detect a signal period between 100 milliseconds and 104 milliseconds with a duty cycle between 48% and 52% and a signal level greater than 2500 A/D units. At least four periods of this qualified signal must be detected before declaring the example aspect ID of 3.

The CSRD 8 provides four independently programmable DSP channels for detection of up to four different carrier frequencies. The signal data provided by the DSP core 62 to the CPU 14,16 for each of these signals can be used independently or as relational data. As such, the CPU 14,16 can declare up to four channels of independent vital declarations, or it can relate the data from one channel to another channel to make declarations based on the existence of multiple carrier frequencies.

In addition to declaring vital output states based on criteria, the DSP core 62 can decode digital data from the input signal. Using the carrier state transitions from the DSP core 62 and applying a programmable baud rate clock, the CPU 14,16 can decode the modulation data into digital data, which can be provided as another vital system output of the CSRD 8. This vital system output is also compared by the two FPGAs 4,6.

Figure 9:
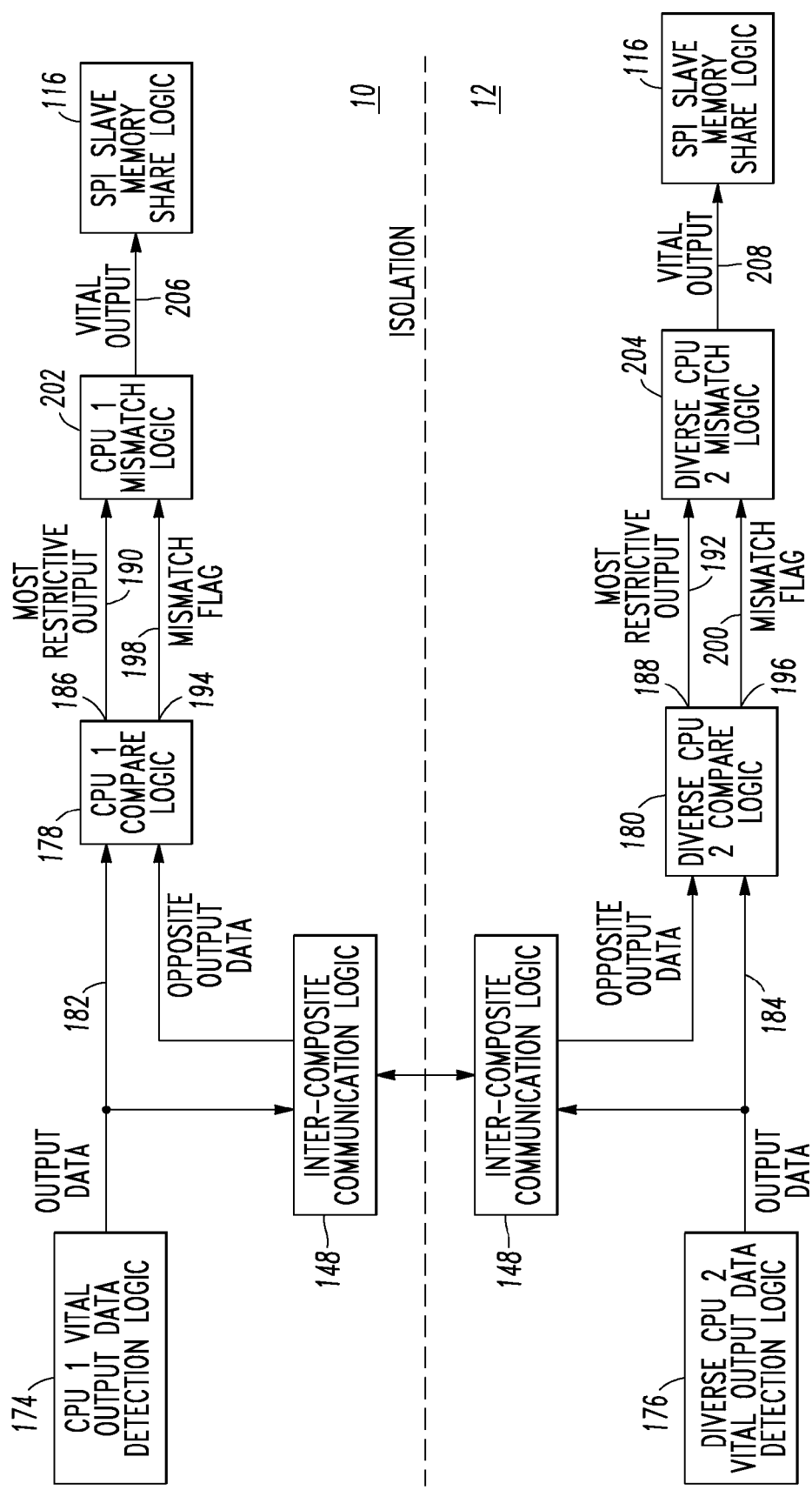
FIG. 9 is a block diagram in schematic form of comparison logic of the cab signal receiver demodulator of FIG. 4 in which each CPU compares current decoded data with current decoded data as received from the other CPU of the other composite item.

FIG. 9 shows CSRD comparison logic 172 that compares current decoded data of one composite item 10 (e.g., without limitation, using a MicroBlaze™ CPU 14 marketed by Xilinx, Inc.) with the current decoded data as received from the other composite CSRD item 12 (e.g., without limitation, using a Nios® II CPU 16 marketed by Altera Corporation) for the current cycle. Any discrepancy between the vital data causes a failure counter (not shown) to be incremented. Any cycle of failure-free comparisons decrements that non-zero counter. If the failure counter exceeds a predetermined maximum limit, then the CSRD CPU software 64 (FIG. 5B) declares a critical failure error. If the CSRD software 64 detects any failure for longer than a predetermined maximum amount of time (e.g., without limitation, 20 seconds which equals 2000 software cycles at 10 ms per software cycle), then it declares a critical failure error. A critical failure error is only reset by cycling power on the CSRD 8. The failure counter increment (e.g., $\geq+1$), decrement (e.g., $\leq-1$), predetermined maximum limit and predetermined maximum amount of time are preferably configurable values.

The CPU vital output data detection logic 174,176 compares the signal characteristic determined from the FPGA hardware with programmable criteria for declaring vital output data, such as aspect, steady carrier declarations and demodulated digital data. The output data selectively can include modulation and steady declarations for each of the four independent filter channels, relational modulation declarations of filter channel #1 with filter channel #2, and filter channel #3 with filter channel #4, and decoded digital data from any combination of up to all four channels.

The inter-composite communication logic 148 provides inter-channel communication of data between the two isolated composite items 10,12.

The CPU compare logic 178,180 compares the output data 182,184 detected by the local composite data detection logic 174,176 with the output data 184,182 detected by the other composite item data detection logic 176,174. This compare logic 178,180 then outputs 186,188 the more restrictive output 190,192 of the two for each element of output data 182, 184, and also outputs 194,196 a mismatch flag 198,200 to indicate when the local output data 182 does not match the other composite item output data 184.

As a non-limiting example, all cab aspects within the CSRD 8 are equated to a number identifier in which the lower the number, the more restrictive the aspect. The aspect identifier 0 is reserved for the most restrictive state of no cab signal detected. If the local composite item data detection logic determines an output aspect value of 3, and the other composite item detects an output aspect value of 2, then the CPU compare logic 178,180 will output the more restrictive output value of 2 and will set the corresponding mismatch flag 198, 200 to indicate that the two CPUs 14,16 do not agree. In doing so, both composite items 10,12 will provide the same output value, which is the more restrictive value of 2.

The CPU mismatch logic 202,204 monitors the mismatch flag 198,200. This mismatch logic 202,204 utilizes a failure counter (not shown), which is incremented when there is a mismatch, decremented when it is not equal to zero and there is no mismatch, and monitored for the total time that the counter is not zero. When either or both of the two maximum thresholds (predetermined maximum limit and predetermined maximum amount of time) are exceeded in the counter and the time measurement, then the mismatch logic 202,204 clears the vital output data 206,208, thereby providing a safe "no result" from the CSRD 8.

The SPI slave memory share logic 116 makes the vital output data 206,208 available to the external client (e.g., external SPI master 18 (FIG. 4)). The data is available as an SPI accessed memory slave, and is also available from both composite items 10,12 of the CSRD 8. This ensures safety because both vital output data 206,208 must be vitally compared by the external client.

Figure 10:
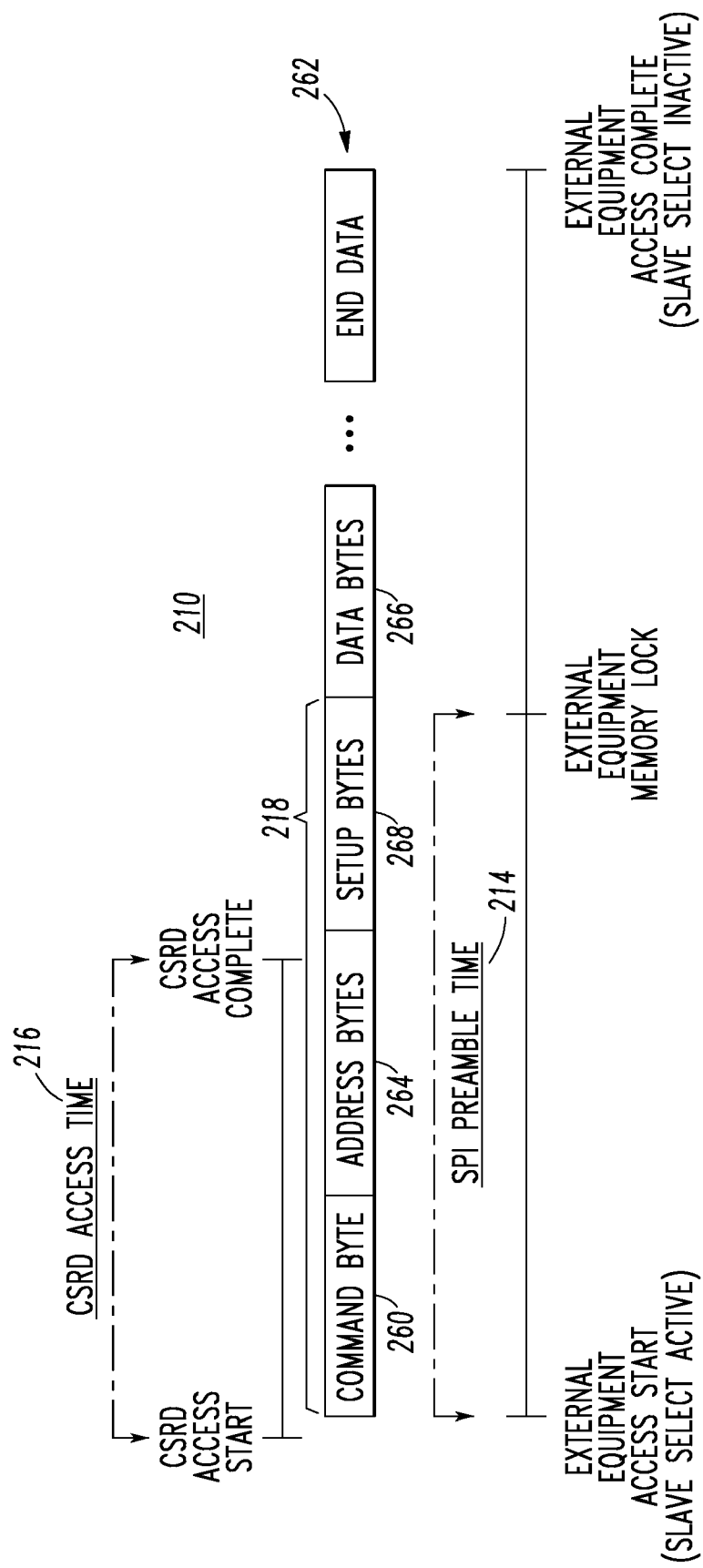
FIG. 10 is a timing diagram showing semaphore handling of a shared dual-ported memory between the local CPU and the external SPI master of FIG. 4.
Figure 11:
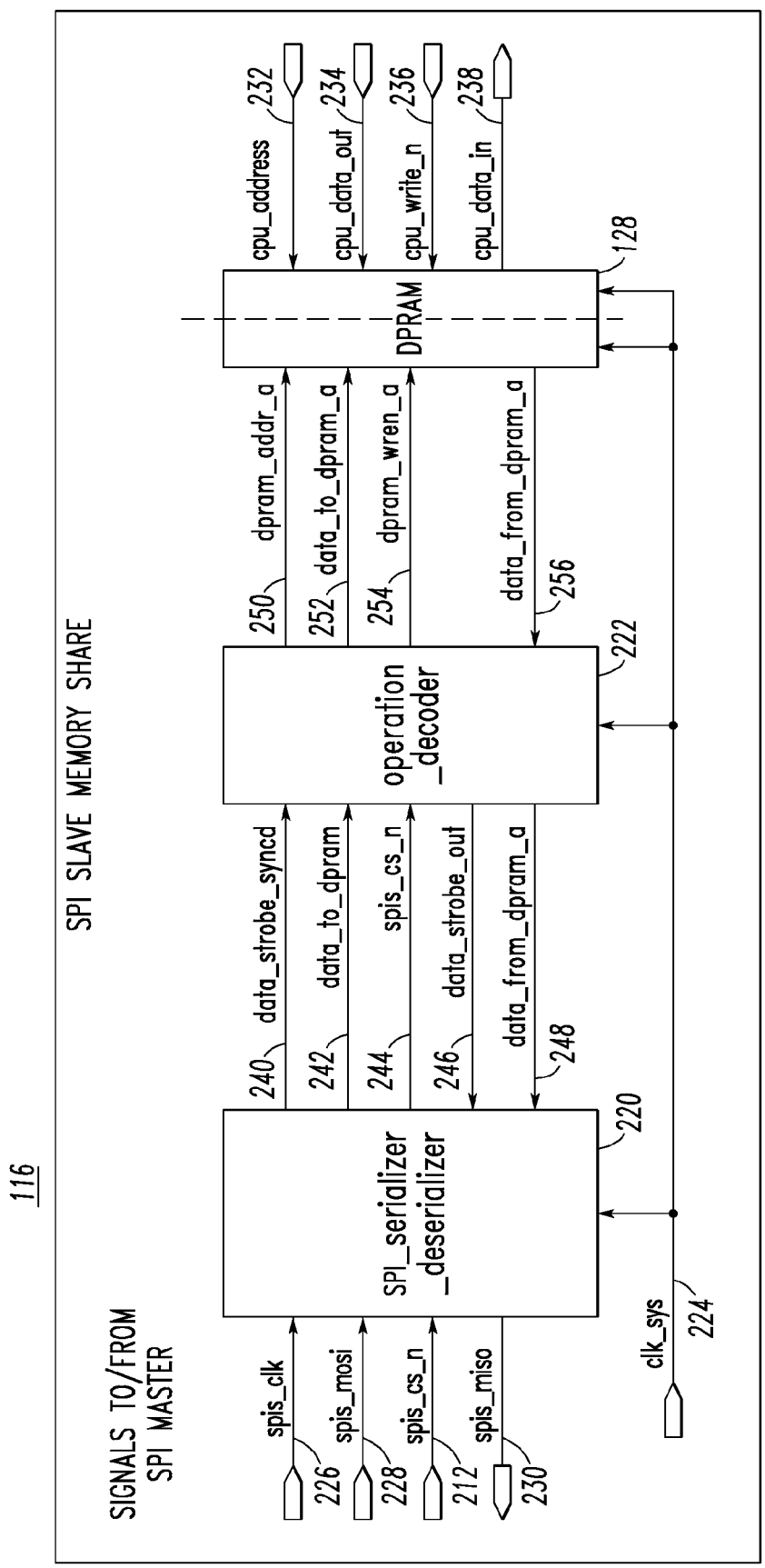
FIG. 11 is a block diagram in schematic form of the SPI slave memory share logic of FIG. 5B.

Referring to FIGS. 10 and 11, a timing diagram 210 for the CSRD CPU 14,16 and the SPI master 18 (FIG. 4) memory access and the SPI slave memory share logic 116 are shown. The SPI slave memory share logic 116 facilitates communications and data transfer between the SPI master 18 (e.g., ATP 18; other external cab equipment; other external client) and the CSRD CPU 14,16. The SPI slave memory share logic 116 functions such that the CSRD 8 appears to the external SPI master 18 as being an SPI Slave. The external SPI master 18 treats the CSRD 8 as a memory mapped peripheral with the ability to read/write a specified memory space in DPRAM 128 for application specific information (e.g.; configuration data; demodulated data; the vital output data 206,208 of FIG. 9). The SPI slave memory share logic 116 serializes/de-serializes SPI data, and controls the DPRAM 128, such that the CSRD CPU 14,16 accesses the DPRAM 128 for both communication and data transfer with the external SPI master 18. The SPI slave memory share logic 116 provides the DPRAM 128 with SPI control on one side, and parallel bus control on the other side. To prevent read/write hazards of a shared resource, a semaphore system is implemented with the setup bytes 268, as will be discussed.

Two potential access hazards exist with shared access to the DPRAM 128 and each of these is handled by the CSRD 8 with the same handling mechanism. The first access hazard is a CSRD access attempt while the external SIP master access is in progress, and the second access hazard is the external SIP master 18 (FIG. 4) attempts access while the CSRD access in progress. For this purpose, read operations from DPRAM 128 and write operations to DPRAM 128 are not treated separately; both of these are considered as being an "access" to DPRAM 128. Since the CSRD CPU 14,16 can access the local DPRAM 128 much faster than the external SPI master 18, and has a much faster application cycle time, a simple status bit is used from the SPI slave memory share logic 116 to the CPU software 64 indicating that an external access is already in progress. This status bit is the SPI slave select line (spis_cs_n) 212 from the external SPI master 18. The CSRD CPU 14,16 does not access the shared DPRAM 128 if the external SPI master 18 is already in progress with an access.

FIG. 10 shows an example of the semaphore handling of the shared DPRAM 128 (FIG. 11) between the CSRD 8 (FIG. 4) and the external SPI master 18 (FIG. 4). The first access hazard of the CSRD access attempt while the external SIP master access is in progress is avoided by the CSRD CPU software 64 (FIG. 5B) disallowing access while the external SPI slave select line signal 212 is active. Since the external SPI master 18 preamble time 214 is greater than the CSRD CPU access time 216, it is allowable for the external SPI master 18 to access the shared DPRAM 128 while the CSRD CPU 14,16 access is already in progress because the CSRD CPU 14,16 access will finish before the external SPI master preamble 218 is fully decoded. In other words, the CSRD CPU 14,16 will finish with its access before the external SPI master preamble 218 is decoded. This will avoid the second access hazard of the external SIP master 18 attempting access while the CSRD access in progress.

FIG. 11 shows the SPI slave memory share logic 116, which includes the SPI serializer/de-serializer 220, the operation decoder 222 and the DPRAM 128.

The signal clk_sys 224, which is input by the circuits 220,222,128, is the system PLL/DCM clock from the clock management and reset control logic 140 (FIG. 5B).

At the SPI serializer/de-serializer 220, the signal spis_clk 226 is the SPI clock from the SPI master 18. This is the SPI slave local clock and is synchronized to the clock clk_sys 224 domain by the circuit 220. The signal spis_mosi 228 is the SPI master out/slave in serial data signal line. The signal spis_cs_n 212 is the SPI active low slave select signal from the SPI master 18. The signal spis_miso 230 is the SPI master in/slave out serial data line.

At the DPRAM 128, the bus cpu_address 232 includes the CPU address bus signals for a DPRAM CPU-side access, and the bus cpu_data_out 234 includes the CPU data bus signals for a DPRAM CPU-side data write. The signal cpu_write_n 236 is the CPU write enable signal for the DPRAM CPU-side. The bus cpu_data_in 238 includes the data bus signals from the DPRAM 128 to the CPU 14,16 for a CPU-side data read.

The following signals are from the SPI serializer/de-serializer 220 to the operation decoder 222. The signal data_strobe_syncd 240 is a data strobe indicating a byte of data synchronized with the system clock clk_sys 224 is ready. The bus data_to_dpram 242 includes a data byte (8 bits) synchronized with the system clock clk_sys 224. The signal spi_cs_n 244 is the slave select signal (from the input signal spis_cs_n 212) indicating that an external SPI master access is in progress. The following signals are from the operation decoder 222 to the SPI serializer/de-serializer 220. The signal data_strobe_out 246 is a data strobe indicating a byte of data from the DPRAM 128 is ready to be shifted out serially, and the signal data_from_dpram_a 248 is DPRAM data to be serialized and shifted out on the spis_miso signal 230.

The following signals are from the operation decoder 222 to the DPRAM 128. The bus dpram_addr_a 250 includes the current address for data to/from the DPRAM SPI-side, and the bus data_to_dpram_a 252 includes the data to the DPRAM SPI-side. The signal dpram_wren_a 254 is the write enable for the SPI-side access to the DPRAM 128 for an external SPI master write operation.

One bus is from the DPRAM 128 to the operation decoder 222. This bus data_from_dpram_a 256 includes the data signals from the DPRAM SIP-side.

The SPI serializer/de-serializer 220 serially shifts data in and out responsive to the clock signal spis_clk 226 when the slave select signal spis_cs_n 212 is active. This circuit 220 enables the CSRD 8 to be treated by the SIP master 18 as an SPI slave, since it serializes/de-serializes data based on the SPI serial clock signal spis_clk 226 and chip select signal spis_cs_n 212, which follows the SPI slave standard. The SPI serializer/de-serializer 220 synchronizes, or hardens, the clock signal spis_clk 226 to the system clock clk_sys 224 domain. After each byte (8 bits) is clocked in from the SPI master 18, the SPI serializer/de-serializer 220 provides the byte-wide data on bus data_to_dpram 242 and a single clock data strobe on signal data_strobe_syncd 240 to the operation decoder 222. Conversely, when the SPI serializer/de-serializer 220 receives the signal data_strobe_out 246 from the operation decoder 222 and the associated byte-wide data on bus data_from_dpram_a 248 as read from the DPRAM 128, this circuit 220 serializes the data and shifts it out on the signal spis_miso 230.

The operation decoder 222 provides the interface between the SPI serializer/de-serializer 220 and the DPRAM 128 (SPI-side). The operation decoder 222 decodes data from the SPI serializer/de-serializer 220, interprets the number of command bytes 260 of the SPI serial message 262 (FIG. 10) as being a read operation or a write operation, and decodes the address bytes 264 to set the starting address for the read operation from or the write operation to DPRAM 128. All such operations start on the falling edge (select) of the signal spis_cs_n 212, and end on the rising edge (de-select) of such signal 212. This allows the external SPI master 18 to clock as much data as desired into or out of the DPRAM 128. The SPI slave determines the byte count. For example, if the SPI master requests to read (or write) 5 bytes from (or to) the CSRD 8, then the SPI master will send out 5*8=40 SPI serial clock pulses, on spis_clk 226, to the CSRD 8, which is defined by the SPI communication standard. The CSRD 8 will keep sending (or receiving) data from (or to) DPRAM 128 sequentially as long as the SPI serial clock pulse exists.

The DPRAM 128 is a dual-ported shared memory between the external SPI master 18 and the CSRD CPU 14,16. The example DPRAM 128 is a byte-aligned, synchronous DPRAM with two read ports and two write ports (SIP-side and CPU-side). The DPRAM 128 uses a single clock, the system clock signal clk_sys 224 for both of these sides.

The CPU software 64 (FIG. 5B) writes to and reads from the DPRAM 128 as a general memory access (e.g., analogous to *(address)=data_write; data_read=*(address)). The CSRD 8 is a passive device to the external SPI master 18. All communication between the CSRD 8 and the external SPI master 18 is initiated by the external SPI master 18.

A suitable SPI message format of the SPI serial message 262 (FIG. 10) is employed for SPI data transfers. The read/write operation (command byte 260), address information (address bytes 264) are embedded in the message 262. Before the SPI master 18 reads from or writes to the CSRD 8, the SPI master 18 sends out the complete message 262, the SPI slave memory share logic 116 receives and decodes the first two portions (command and address bytes 260,264) of the message 262. From this, it knows the nature (read or write; address) of the memory request from the SPI master 18. If the SPI master 18 requests a read operation from the CSRD 8 (DPRAM 128), then the SPI slave memory share logic 116 reads data from the DPRAM 128, and sends serialized data, which is synchronized with the SPI clock signal spis_clk 226. If the external SPI master 18 requests a write operation to the CSRD 8 (DPRAM 128), then the SPI slave memory share logic 116 receives the serial data from the external SPI master 18, de-serializes the data, and saves the data to the DPRAM 128.

Following voting (FIG. 9), the SPI slave memory share logic 116 provides the aspect information to the SPI master (e.g., ATP 18) in a serial message format (FIG. 10), which as part of the data bytes 266 includes aspect, CRC and sequence number. The implementation of the SPI slave memory share logic 116 is independent of the precise message format and treats messages, such as 262, as binary data in the DPRAM 128.

As a non-limiting example, aspect data can be reported through four messages, one for each demodulation channel. Each message includes the message protocol in addition to aspect data for all possible configurations such that the external system may monitor aspect information as needed. An example of the message data for a single demodulation channel would be sequence number (which is incremented each subsequent cycle), vital aspect ID detected of the channel, non-vital signal detection diagnostic data for the demodulation channel, and a 32-bit cyclic redundancy code calculated on all the data previously described in this example.

The CPU software 64 (FIG. 5B) uses general memory read and memory write operations to access the DPRAM 128. The CPU 14,16 reads an incoming message 262 (from the SPI master 18) from the DPRAM 128 and stores the outgoing message (not shown) (to the SPI master 18) in the DPRAM 128. The SPI slave memory share logic 116 reads the data of the outgoing message from the DPRAM 128, serializes the data, and transfers the serial data following the SPI standard.

Two dummy setup bytes 268 are used for DPRAM arbitration as was discussed, above. These dummy setup bytes 268 are used to guarantee that the SPI preamble time 214 is greater than the CSRD CPU access time 216.

Referring to FIG. 12, the inter-composite item memory share logic 32 provides data synchronization across the inter-composite items 10,12 (FIG. 4) and a memory share function between those items 10, 12. The local memory share logic 32 (e.g., of composite item 10) is able to be read from and written to by the local CPU (e.g., CPU 14). The data in the local memory share logic 32 is synchronized with the other memory share logic 32 in the other composite item (e.g., composite item 12) via inter-composite item communications The inter-composite item memory share logic 32 includes a write controller (phw_write_ctrl 270), a CPU read-only DPRAM 130, a read controller (phw_read_ctrl 272) and a CPU write-only DPRAM 132. All of these four circuits 270, 130,272,132 receive from the clock management and reset control logic 140 (FIG. 5B) the signal reset_n 274, which is the asynchronous master reset signal, and the system clock signal clk_sys 224, which is the system PLL/DCM clock.

On the other composite item side (e.g., the side to composite item 12), the write controller 270 outputs the signal phw_req_out 276, which is a data synchronization request output, and inputs the signal phw_ds_in 278, which is the input data strobe indicating new input data. On the local CPU side, the write controller 270 inputs the signal cpu_req_flag 280, which when active indicates that the local CPU (e.g., CPU 14) requests data synchronization, inputs the signal cpu_rd_flag 282, which indicates that the local CPU (e.g., CPU 14) is performing a read operation from the DPRAM 130, and outputs the signal phw_wr_flag 284, which indicates that the other composite item (e.g., composite item 12) is performing a write operation to the DPRAM 130.

The read controller 272, at the other composite item side (e.g., the side from composite item 12), inputs the signal phw_req_in 286, which is a data synchronization request input, and outputs the signal phw_ds_out 288, which is the output data strobe indicating new output data. At the local CPU side, the read controller 272 inputs the signal cpu_wr_flag 290, which indicates that the local CPU (e.g., CPU 14) is performing a write operation to the DPRAM 132, and outputs the signal phw_rd_flag 292, which indicates that the other composite item (e.g., composite item 12) is performing a read operation from the DPRAM 132.

On the other composite item side (e.g., the side from composite item 12), the DPRAM 130 receives the bus phw_din 294, which includes the input data signals from the other composite item, the bus phw_addr_w 296, which includes the input address signals to access the DPRAM 130, and the signal phw_wea_w 298, which is the write enable signal to access the DPRAM 130. The DPRAM 130, on the local CPU side, outputs the bus inter_cpu_data_in 300, which includes the output data signals to the local CPU (e.g., CPU 14), inputs the signal inter_cpu_write 302, which is the write enable signal from the local CPU, and inputs the bus inter_cpu_address 304, which includes the input address signals from the local CPU.

The DPRAM 132, on the other composite item side (e.g., the side to composite item 12), outputs the bus phw_dout 306, which includes the output data signals to the composite item side, and inputs the bus phw_addr_r 308, which includes the input address signals to access the DPRAM 132, and the signal phw_wea_r 310, which is the read enable signal to access the DPRAM 132. On the local CPU side, the DPRAM 132 inputs the bus inter_cpu_data_out 312, which includes the input data signals from the local CPU (e.g., CPU 14) to the DPRAM 132, the bus inter_cpu_address 304, which includes the address signals from the local CPU to access the DPRAM 132, and the signal inter_cpu_write 302, which is the local CPU write enable signal to access the DPRAM 132. The signal inter_cpu_write 302 (not shown) is a CPU bus signal indicating a CPU write operation, which signal is connected to a 'we' (not shown) port (not numbered) on the DPRAM 130. When the CPU 14,16 performs a read operation, the signal inter_cpu_write 302 equals logic '0' and the DPRAM 130 acts as being read on the CPU side.

Figure 13:
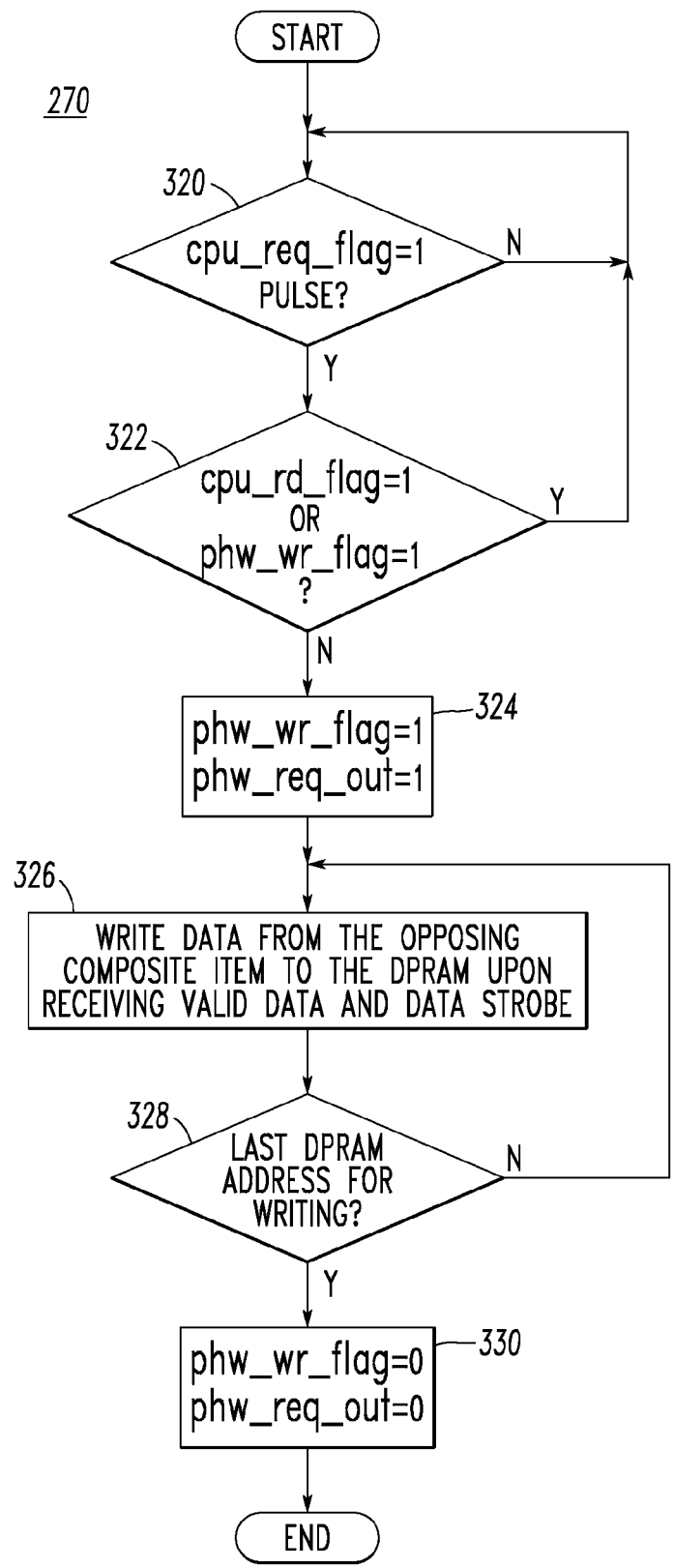
FIG. 13 is a flowchart of the write controller of FIG. 12.

Referring to FIG. 13, the write controller 270 (FIG. 12), as will be described, upon receiving the data synchronization request signal cpu_req_flag 280 from the local CPU, at 320, sends the request signal phw_req_out 276 to the other composite item side, at 324, which then writes the other composite item data into the DPRAM 130 and then releases the request signal phw_req_out 276, at 330, after all of the other composite item data are synchronized. First, at 320, after detecting the signal cpu_req_flag 280 being active, the local write controller 270 checks both the signal cpu_rd_flag 282 and the signal phw_wr_flag 284 to confirm that the DPRAM 130 is not in use. If so, then, at 324, the write controller 270 sets the signal phw_wr_flag 284 to signal the local CPU (e.g., CPU 14) that the other composite item write is in progress. This action guarantees that the local CPU is blocked from reading the DPRAM 130 while the other composite item (e.g., composite item 12) is writing. From now on, the write controller 270 is ready for receiving data from the opposing composite item at any time. Step 324 also sets the request signal phw_req_out 276. Upon receiving each data strobe signal phw_ds_in 306, at 326, the input data is written into the DPRAM 130, in sequence, until the last specified memory address of the DPRAM 130 is accessed, at 328. After all data are received, the signals phw_wr_flag 284 and phw_req_out 276 are cleared, at 330.

Figure 14:
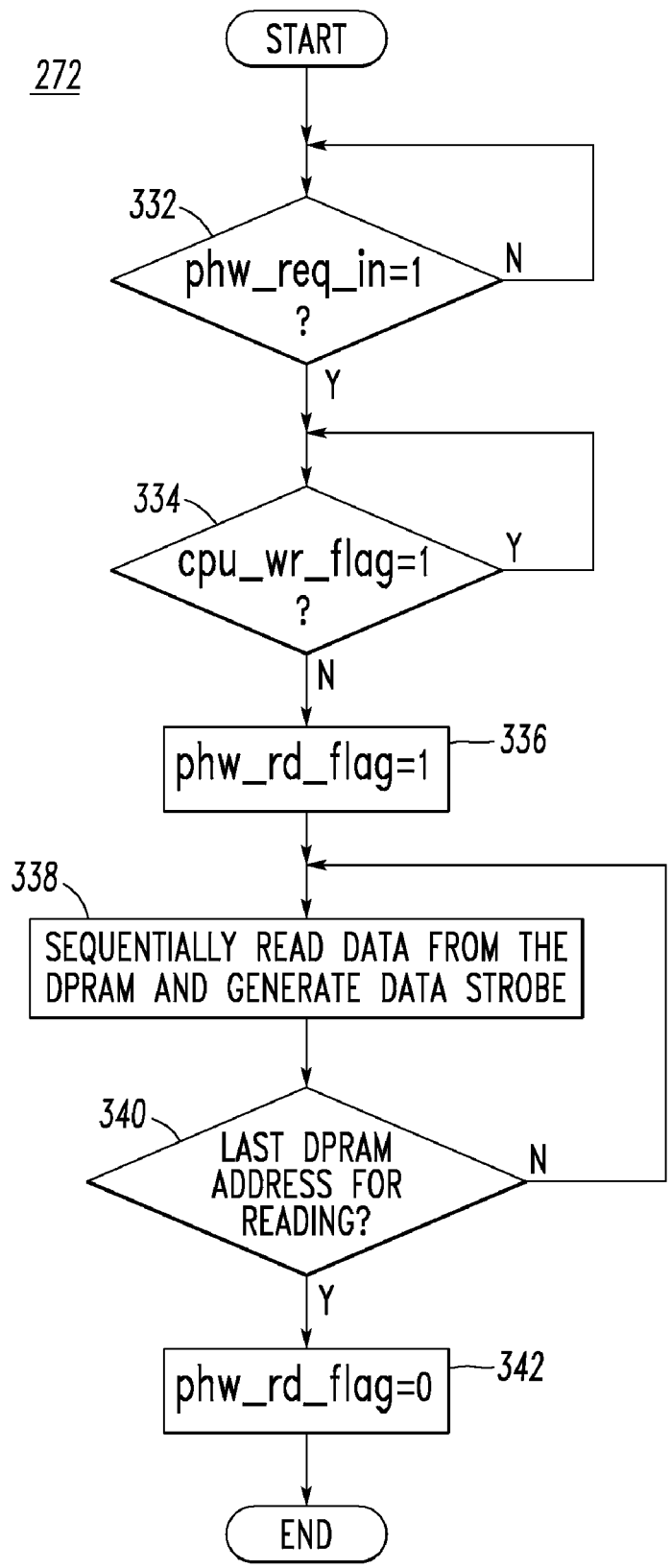
FIG. 14 is a flowchart of the read controller of FIG. 12.

Referring to FIG. 14, the read controller (phw_read_ctrl 272), as will be discussed, upon receiving an active signal phw_req_in 286, at 332, from the opposing composite item (e.g., composite item 12) to request data synchronization, the read controller 272 checks the signal cpu_wr_flag 290, at 334, to check whether the local CPU (e.g., CPU 14) is actively writing the DPRAM 132. If the signal cpu_wr_flag 290 is not active, at 334, which indicates the local CPU is not actively writing data into the DPRAM 132, then the read controller 272 starts the read operation. Otherwise, the read controller 272 waits, at 334, until the local CPU finishes writing data to the DPRAM 132.−+

Before reading data, at 336, from the DPRAM 132, the read controller 272 sets the signal phw_rd_flag 292 (FIG. 12) to block the local CPU (e.g., CPU 14) from writing to the DPRAM 132. Then, at 338, the read controller 272 begins reading and sending data from the DPRAM 132 to the other composite item (e.g., composite item 12) sequentially, starting at the base address of the DPRAM 132. The data strobe signal phw_ds_out 288 is generated, at 338, for each valid data. After all data in the DPRAM 132 are sent to the other opposing item, as determined at 340, the read controller 272 clears the signal phw_rd_flag 292, at 342, to the local CPU, which permits it to again access the DPRAM 132.

The DPRAMs 130 and 132 are included in the FPGA 4,6. Each DPRAM 130,132 has two ports, and each of these ports supports reading and writing operations. The two ports function at the same system clock frequency of the clock signal clk_sys 224 (FIG. 12). The DPRAM 130 is assigned to be read by the local CPU (e.g., CPU 14) and written by the write controller 270 (for the other composite item (e.g., composite item 12)). The DPRAM 132 is assigned to be written by the local CPU and read by the read controller 272 (for the other composite item). In order to protect data integrity, only one operation (either read or write) can be performed on each of the DPRAMs 130 and 132. For the DPRAM 130, the local CPU read operation and the write controller write operation are mutually exclusive. For the DPRAM 132, the local CPU write operation and read controller read operation are mutually exclusive.

The write controller (phw_write_ctrl 270) (FIG. 12) generates the request signal phw_req_out 224 to initiate memory synchronization for the DPRAM 130, and controls memory write operations performed by the inter-composite item memory share logic 32 (FIG. 12) to the DPRAM 130. The write controller 270 receives the request signal cpu_req_flag 280 from the local CPU and generates the pulse signal phw_req_out 276 to the other composite item. At the same time, the write controller 270 sets a semaphore to prevent the local CPU from reading the local CPU read-only DPRAM 130 during the memory synchronization. Afterwards, the write controller 270 waits for the data strobe signal phw_ds_in 278 and the data signals of the bus phw_din 294 from the other composite item. The data are stored into the CPU read-only DPRAM 130 in sequence.

Figure 15:
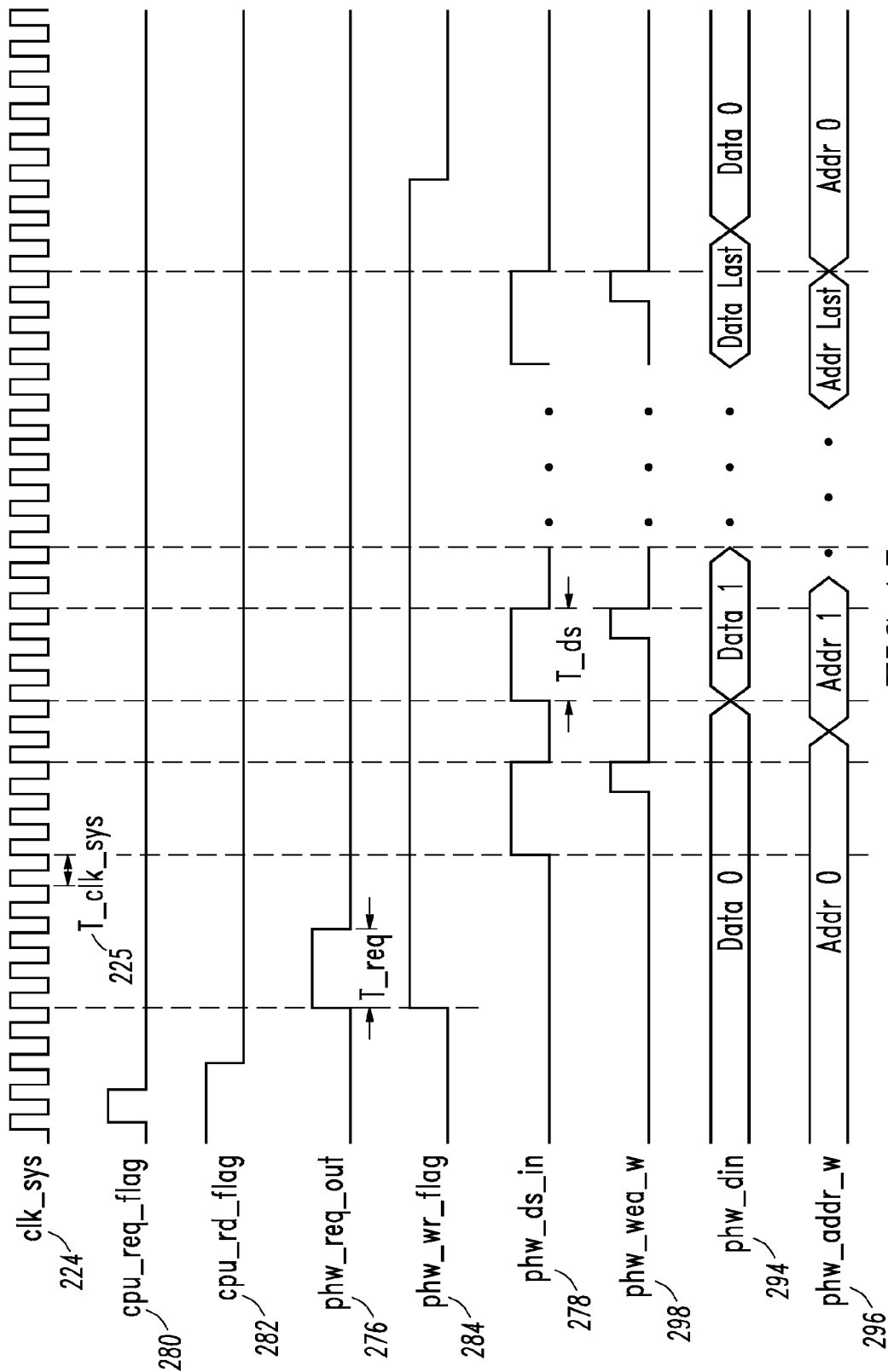
FIG. 15 is a timing diagram of the write controller of FIG. 12.

For example, in order to compensate for propagation delays on the inter-composite communication channels 42 (FIG. 4), the data from the other composite item is active for about five times the period T_clk_sys 225 of the clock signal clk_sys 224 (FIG. 15). The maximum difference between the communication channels is less than about two clock cycles; hence, after two clock cycles of the rising edge of each data strobe signal phw_ds_in 278, the data signals of the bus phw_din 294 are guaranteed to be valid. Therefore, such data signals are latched two clock cycles after the rising-edge of each such data strobe.

The reset operation is to initialize the value of signals during and right after reset signal is active.

In the write controller 270, when the signal reset_n 274 is active low, the signals phw_req_out 276, phw_wea_w 298 and phw_wr_flag 284 are set inactive asynchronously, and the signals of the bus phw_addr_w 296 are set to zero asynchronously. The outputs of the write controller 270 are kept at the reset states if the signal cpu_rd_flag 282 is set, at 322, and the write controller 270 waits for another cpu_req_flag 280, at 320.

Referring to FIG. 15, the write controller 270 receives the request signal cpu_req_flag 280 from the local CPU (e.g., CPU 14). If the signal cpu_rd_flag 282 is active, then the write controller 270 waits until the signal cpu_rd_flag 282 is inactive. Otherwise, the write controller 270 generates the pulse signal phw_req_out 276 to the other composite item (e.g., composite item 12). At the same time, the signal phw_wr_flag 284 is set active. If the signal cpu_req_flag 280 is detected as being active, then the write controller 270 begins to check the status of the signal cpu_rd_flag 282.

If the signal cpu_req_flag 280 is detected as being active, at 320, and the signal cpu_rd_flag 282 is inactive, at 322, then the write controller 270 sets the pulse signal phw_req_out 276 active for at least about the width of one clock cycle (i.e., period 225) of the clock signal clk_sys 224. Otherwise, the signal phw_req_out 276 is set inactive.

The write operation starts when the first rising edge of the data strobe signal phw_ds_in 278 arrives. After two clock cycles from the rising edge of each data strobe signal phw_ds_in 278, the signal phw_wea_w 298 is active high for one clock cycle to write valid data into the DPRAM 130. Then, after one more clock cycle, the signals of the bus phw_addr_w 296 are increased to the next address for the next memory write. After the last byte of data is written into the DPRAM 130, the write controller 270 clears the signal phw_wr_flag 284 (FIG. 12) to the local CPU.

The write controller 270 generates sequential memory address signals of the bus phw_addr_w 296 and memory write signals phw_wea_w 298 to write data signals of the data bus phw_din 294 from the other composite item into the dual port memory DPRAM 130 in sequence. Data is stored to this memory two clock cycles after the rising edge of each data strobe signal phw_ds_in 278 is detected.

Referring again to FIG. 12, the read controller (phw_read_ctrl) 272 provides read control for the DPRAM 132. Upon receiving an active request signal phw_req_in 286 from the other composite item (e.g., composite item 12), the read controller 272 checks if the local CPU (e.g., CPU 14) is accessing the CPU-write-only dual port memory DPRAM 132. If so, then the read controller 272 waits until this memory access terminates. Otherwise, the read controller 272 sets up a semaphore to block the local CPU from writing to the DPRAM 132, outputs the address signals of the bus phw_addr_r 308, and outputs the memory read signal phw_wea_r 310 to enable valid data output from the DPRAM 132. During the period of each valid data, the data strobe signal phw_ds_out 288 is asserted. All data in the CPU-write_only memory DPRAM 132 are read and output to the other composite item during one complete read operation.

In order to compensate for the various propagation delays on the inter-composite communication channels 42 (FIG. 4), the width of the data strobe signal phw_ds_out 288 is set to about three clock cycles, which is about two times as wide as the maximum difference of the delay. In this manner, valid data signals of the bus phw_dout 306 are guaranteed to appear at two clock cycles after the rising edge of each such data strobe even after they are transmitted to the other composite item.

In the read controller 272, a reset operation initializes the value of various signals during and right after the reset signal reset_n 274 is active. This includes the signal phw_ds_out 288 and phw_rd_flag 292 being set inactive asynchronously, and the address signals of the bus phw_addr_r 308 being set to zero asynchronously.

A read operation by the read controller 272 from the DPRAM 132 starts when the signal cpu_wr_flag 290 is inactive (logic zero) and after the active edge of the signal phw_req_in 276 is detected. Then, the read controller 272 sets the signal phw_rd_flag 292. Next, the memory address signals of the bus phw_addr_r 308 and the memory read signal phw_wea_r 310 are generated to sequentially read data from the dual port memory DPRAM 132. The data strobe signal phw_ds_out 288 is active high indicating valid output data from the DPRAM 132. After the last byte of data in the dual memory DPRAM 132 is read, the read controller 272 clears the signal phw_rd_flag 292.

Figure 16:
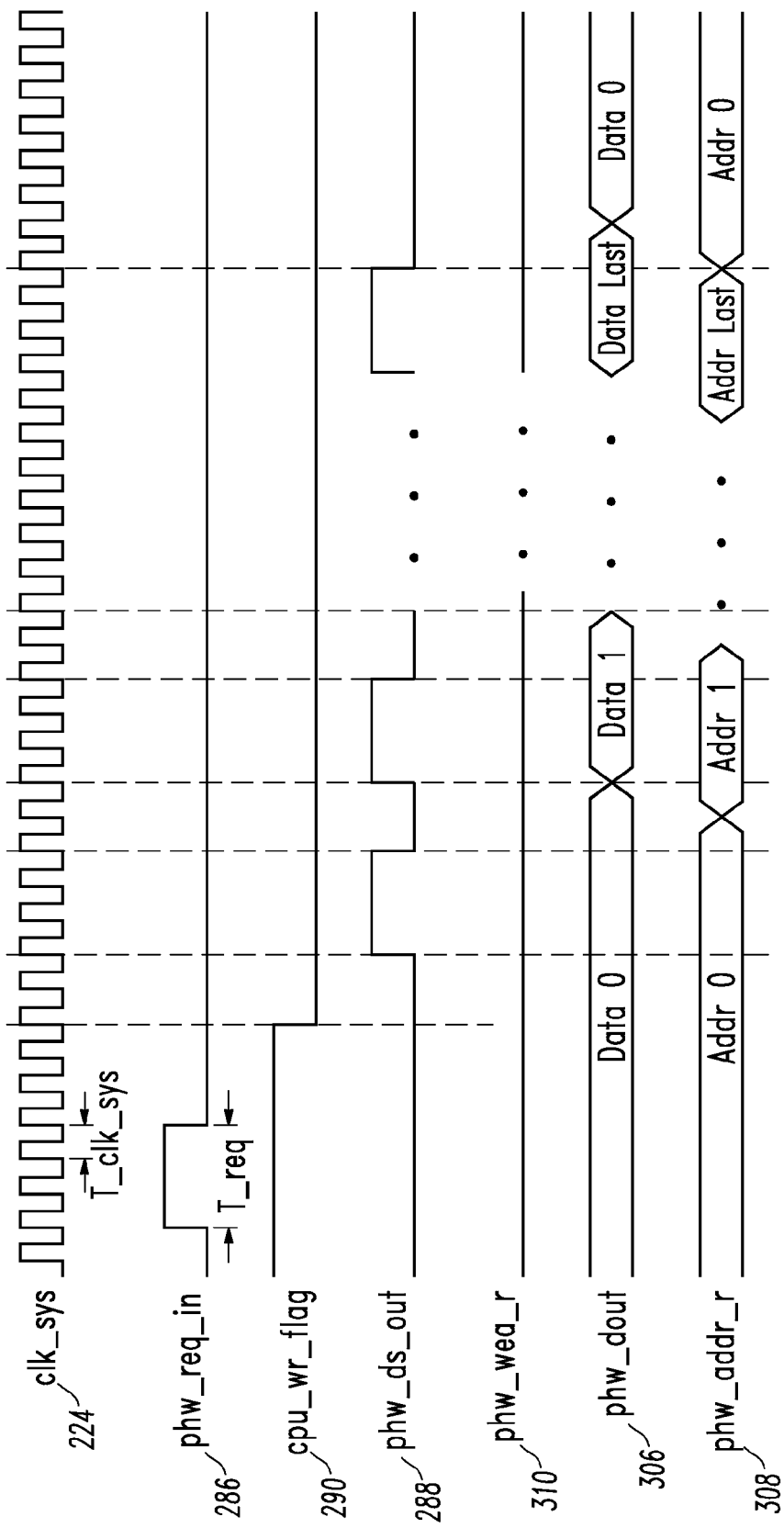
FIG. 16 is a timing diagram of the read controller of FIG. 12.

Referring to FIG. 16, if the rising edge of the signal phw_req_in 286 is detected, then the read controller 272 begins to check the status of the signal cpu_wr_flag 290. The output of the read controller 272 is kept at the reset states until the signal cpu_wr_flag 290 is cleared. If the rising edge of the signal phw_req_in 286 is detected and the signal cpu_wr_flag 290 is inactive (logic zero), then the read controller 272 sets the signal phw_rd_flag 292 (FIG. 12) active. Otherwise, that signal is set inactive.

After the signal phw_rd_flag 292 (FIG. 12) is set active, the read controller 272 generates sequential memory address signals of the bus phw_addr_r 308 to read all data signals of the data bus phw_dout 306 from the dual port memory DPRAM 132 in sequence. The memory read signal phw_wea_r 310 is always kept low (i.e., read) to enable the DPRAM 132 to be read-only on the phw (read controller 272) side. During the period of each valid data, the data strobe signal phw_ds_out 288 is asserted for three clock cycles and de-asserted for two clock cycles. After the last byte in the dual port memory DPRAM 132 is read by the read controller 272, it clears the signal phw_rd_flag 292.

The CPU software 64 (FIG. 5B) writes to the DPRAM 132 as a general memory access (e.g., analogous to *(address)= data_write), and reads from the DPRAM 132 as a general memory access (e.g., analogous to data_read=*(address)).

Figure 17:
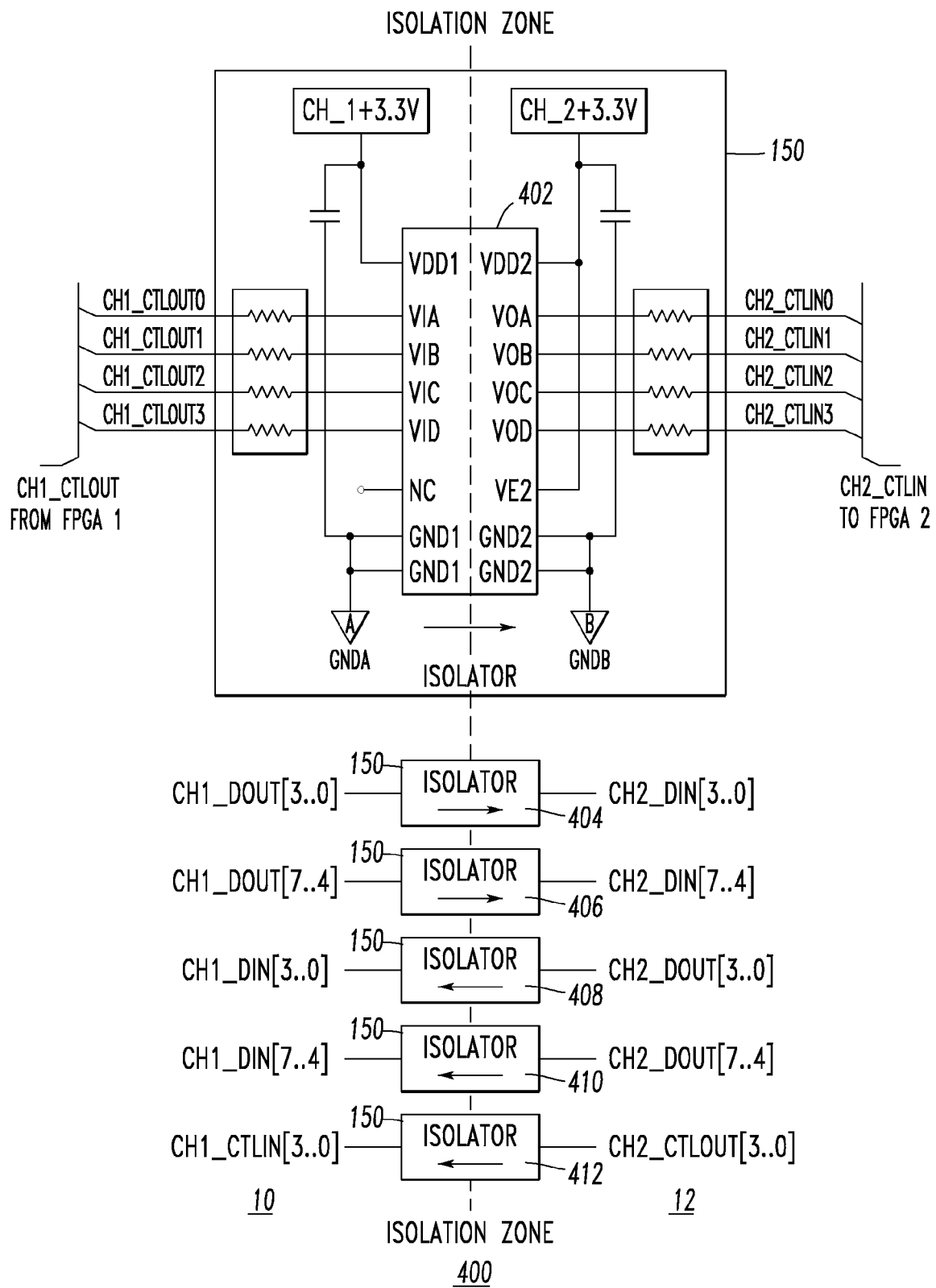
FIG. 17 is a block diagram in schematic form of the isolation circuit for the cab signal receiver demodulator of FIG. 4.

For example and without limitation, in the example embodiment, for every five cycles of the system clock clk_sys 224, the inter-composite logic 32 (FIG. 12) transfers one byte of data. The example five clock cycles compensate for the propagation delays introduced, for example, by the isolation circuit 400 (FIG. 17). For example, based upon an example 85 MHz system clock frequency, the data speed is 85 MHz per clock cycle/5 clock cycles per byte*8 bits per byte=136 Mb/S.

Referring to FIG. 17, the isolation circuit 400 of the CSRD 8 preferably provides about 2500 $V_{RMS}$ isolation between the two composite items 10,12. As a non-limiting example, a quad channel digital isolator 402, such as ADUM1400CRW marketed by Analog Devices, Inc. of Norwood, Mass., provides four independent isolation channels on each device. Six of these quad channel digital isolators 402,404,406,408,410, 412 are employed as follows: (1) four output control signals CH1_CTLOUT[3..0] are isolated by isolator 402 before being input by the other composite item 12 as input control CH2_CTLIN[3..0]; (2-3) isolators 404,406 isolate output data signals CH1_DOUT[7..0] for input by the other composite item 12 as input data signals CH2_DIN[7..0]; (4) isolator 412 isolates output control signals CH2_CTLOUT[3..0] from composite item 12 for input by the composite item 10 as input control signals CH1_CTLIN[3..0]; and (5-6) isolators 408,410 isolate output data signals CH2_DOUT[7..0] from composite item 12 for input by the composite item 10 as input data signals CH1_DIN[7..0].

Here, CH1_CTLIN[0] is the signal phw_ds_in 278 of composite item 10 and CH1_CTLIN[1] is the signal phw_req_in 286 of composite item 10, CH1_CTLOUT[0] is the signal phw_ds_out 288 of composite item 10, and CH1_CTLOUT [1] is the signal phw_req_out 276 of composite item 10. CH1_CTLIN[3..2] and CH1_CTLOUT[3..2] are reserved (unused) signals. CH1_CTLDIN[7..0] are the data signals of the bus phw_din 294 of composite item 10, and CH1_CTLDOUT[7..0] are the data signals of the bus phw_dout 306 of composite item 10.

Similarly, CH2_CTLIN[0] is the signal phw_ds_in 278 of composite item 12 and CH2_CTLIN[1] is the signal phw_req_in 286 of composite item 12, CH2_CTLOUT[0] is the signal phw_ds_out 288 of composite item 12, and CH2_CTLOUT[1] is the signal phw_req_out 276 of composite item 12. CH2_CTLIN[3..2] and CH2_CTLOUT[3..2] are reserved (unused) signals. CH2_CTLDIN[7..0] are the data signals of the bus phw_din 294 of composite item 12, and CH2_CTLDOUT[7..0] are the data signals of the bus phw_dout 306 of composite item 12.

The disclosed CSRD 8 and its FPGA programmable hardware technology allow for modular application with a relatively very high number of configurable I/O (e.g., a DSP cab signal board; a low-cost vital I/O board; an Automatic Train Operation (ATO) board). Diverse FPGAs 4,6 and diverse soft processor cores 14,16 make the CSRD 8 highly scalable and provide lowered obsolescence risk making the CSRD 8 a good choice for a systems engineer looking for a vital platform CPU. The vital two-out-of-two architecture (FIG. 9) provides maximum Safety Integrity Level (SIL-4) in quantitative failure analysis for safety critical design. The FPGAs 4,6 provide migration paths upward and downward for a low-cost version, or a fully featured version.

The CSRD 8 provides maximum flexibility by preferably being readily configured for all known carrier frequencies. Preferably, new cab signal frequencies are added to the available carrier frequencies without changes to hardware or application software. For example, a table of configuration data can be stored in nonvolatile memory on the CSRD 8 to provide this configurability, and configuration data can be changed as needed using a suitable user interface. In this manner, although changed configuration data must be validated, neither the hardware nor the application software 64

(FIG. 5B) need to be changed or re-verified for these changes. Similarly, the definitions of project aspects can also be stored as configuration data.

The CSRD 8 provides a high-performance safety architecture (platform) using composite fail-safety, FPGA technology, and soft-processors 14,16 for maximum flexibility and scalability. This fulfills the highest safety requirements since the diverse FPGA/soft processor architecture satisfies SIL-4 CENELEC requirements. This also saves PCB space and cost since the combination of a sampled digital signal processing (DSP) system and FPGAs 4,6 provides a very high level of flexibility and scalability, while drastically reducing board-space when compared to a discrete component solution. In comparison to a conventional cab signal architecture, the CSRD 8 replaces up to about ten PCBs in non-vital signaling, and five PCBs in vital signaling.

The CSRD 8 maximizes flexibility, configurability and scalability by being configurable to receive and demodulate AF-90X FSK track signals, modulated carrier (MC) cab signals, steady carrier track signals and impulse response system track signals. A DSP architecture employs dynamic "soft" configuration of, for example, filter corner frequencies, filter topology, filter type and response. This also reduces obsolescence risk, since the DSP architecture lowers obsolescence and degradation issues associated with dozens of tuned analog filter circuits. Implementation of a soft-core processor 14,16 as opposed to a hard device also reduces risk associated with microprocessor die changes and associated logic obsolescence. The soft processor timing to off-chip peripherals is completely configurable and scalable, since FPGAs 4,6 lend themselves to in-system configurability.

The CSRD 8 provides a product-based configuration for dynamic project-implementation that forms a configurable and versatile solution. The CSRD 8 allows for complete project specific configuration for implementation. By generating new digital filter coefficients, new decoding parameters and aspect definitions using a simple user interface, the CSRD 8 can be adapted to target a completely new set of cab signaling requirements. For example, through various configurations, the CSRD 8 supports multi-territory cab signals. The CSRD 8 can store several selectable configurations such that as a railroad vehicle is moved from one territory to another, the CSRD 8 can change to the selected cab signal type. For example, the CSRD 8 can be configured to receive FSK signals from an AF-90x territory. Then, if the vehicle moves into 100 Hz/205 Hz territory, the CSRD 8 can dynamically change from decoding FSK to decoding modulated aspects. In this example, the single CSRD 8 replaces an FSK receiver PCB, an FSK controller PCB, a 100 Hz filter PCB, a 250 Hz filter PCB and a decoder PCB.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A processor comprising:
   a first field programmable gate array comprising:
      a first central processing unit core programmed to perform a first function, and
      first programmable hardware logics programmed to perform a second function; and
   a second field programmable gate array comprising:
      a second central processing unit core programmed to perform a third function, and
      second programmable hardware logics programmed to perform a fourth function; and
   a communication interface between said first and second central processing unit cores,
   wherein said second field programmable gate array is diverse with respect to said first field programmable gate array,
   wherein a portion of the first function is structured to communicate first information from said first central processing unit core to said second central processing unit core through said communication interface,
   wherein a portion of the third function is structured to communicate second information from said second central processing unit core to said first central processing unit core through said communication interface, and, otherwise, said first function is substantially the same as said third function, and
   wherein said second function is substantially the same as said fourth function.

2. The processor of claim 1 wherein said second central processing unit core is diverse with respect to said first central processing unit core.

3. The processor of claim 1 wherein said first central processing unit core is a first soft IP core central processing unit; and wherein said second central processing unit core is a second soft IP core central processing unit.

4. The processor of claim 3 wherein said second soft IP core central processing unit is diverse with respect to said first soft IP core central processing unit.

5. The processor of claim 1 wherein said first field programmable gate array further comprises a first IP core cooperating with said first programmable hardware logics to perform the second function; and wherein said second field programmable gate array further comprises a second IP core cooperating with said second programmable hardware logics to perform the fourth function.

6. The processor of claim 5 wherein said second IP core is diverse with respect to said first IP core.

7. A cab signal apparatus for a railroad vehicle, said cab signal apparatus comprising:
   a first sub-system comprising:
      a first receiver structured to receive a plurality of track signals,
      a first field programmable gate array cooperating with said first receiver, said first field programmable gate array comprising:
         a first central processing unit core programmed to input, demodulate and decode said track signals to provide a first number of track signal aspects,
         first programmable hardware logics programmed to perform a first function, and
         a first communication interface cooperating with said first central processing unit core to communicate said first number of track signal aspects to a first device external to said cab signal apparatus;
   a second sub-system comprising:
      a second receiver structured to receive said plurality of track signals,
      a second field programmable gate array cooperating with said second receiver, said second field programmable gate array comprising:
         a second central processing unit core programmed to input, demodulate and decode said track signals to provide a second number of track signal aspects,
         second programmable hardware logics programmed to perform a second function, and a second communication interface cooperating with said second central processing unit core to communicate said second number of track signal aspects to a second device external to said cab signal apparatus; and a third communication interface between said first and second central processing unit cores, wherein said second field programmable gate array is diverse with respect to said first field programmable gate array, wherein said first central processing unit core is further programmed to communicate said first number of track signal aspects from said first central processing unit core to said second central processing unit core through said third communication interface, wherein said second central processing unit core is further programmed to communicate said second number of track signal aspects from said second central processing unit core to said first central processing unit core through said third communication interface, and wherein said first function is substantially the same as said second function.

8. The cab signal apparatus of claim 7 wherein said second central processing unit core is diverse with respect to said first central processing unit core.

9. The cab signal apparatus of claim 7 wherein said first central processing unit core is a first soft IP core central processing unit; and wherein said second central processing unit core is a second soft IP core central processing unit.

10. The cab signal apparatus of claim 9 wherein said second soft IP core central processing unit is diverse with respect to said first soft IP core central processing unit.

11. The cab signal apparatus of claim 7 wherein said first field programmable gate array further comprises a first IP core cooperating with said first programmable hardware logics to perform the first function; and wherein said second field programmable gate array further comprises a second IP core cooperating with said second programmable hardware logics to perform the second function.

12. The cab signal apparatus of claim 11 wherein said second IP core is diverse with respect to said first IP core.

13. The cab signal apparatus of claim 7 wherein said first communication interface comprises a first dual port memory having a first port and a second port, and a second dual port memory having a first port and a second port, the first port of said first dual port memory being readable by said first central processing unit core, the first port of said second dual port memory being writable by said first central processing unit core; wherein the portion of the first function is further structured to control said first and second dual port memories; wherein said second communication interface comprises a third dual port memory having a first port and a second port, and a fourth dual port memory having a first port and a second port, the first port of said third dual port memory being readable by said second central processing unit, the first port of said fourth dual port memory being writable by said second central processing unit core; wherein the portion of the second function is further structured to control said third and fourth dual port memories, to read said second number of track signal aspects from the second port of said fourth dual port memory and communicate said second number of track signal aspects to said third communication interface, and to communicate said first number of track signal aspects from said third communication interface and write said first number of track signal aspects to the second port of said third dual port memory; and wherein the portion of the first function is further structured to read said first number of track signal aspects from the second port of said second dual port memory and communicate said first number of track signal aspects to said third communication interface, and to communicate said second number of track signal aspects from said third communication interface and write said second number of track signal aspects to the second port of said first dual port memory.

14. The cab signal apparatus of claim 13 wherein said first number of track signal aspects includes a plurality of bytes of information; wherein the portion of the first function is further structured to determine that said third communication interface is requesting to communicate said first number of track signal aspects, to determine that said first central processing unit core is not attempting to write to the first port of said second dual port memory, to confirm to said third communication interface that communication of said first number of track signal aspects will begin, to sequentially read each of said plurality of bytes of information from the second port of said second dual port memory and sequentially communicate said each of said plurality of bytes of information to said third communication interface, and to confirm to said third communication interface that communication of said first number of track signal aspects has completed.

15. The cab signal apparatus of claim 13 wherein said second number of track signal aspects includes a plurality of bytes of information; wherein the portion of the first function is further structured to determine that said first central processing unit core is requesting to read said second number of track signal aspects from the first port of said first dual port memory, to determine that said first central processing unit core is not currently attempting to read from the first port of said first dual port memory, to determine that no write is currently in progress to the second port of said first dual port memory, to confirm to said first central processing unit core that writes to the second port of said first dual port memory will begin, to indicate to said third communication interface that communication of said second number of track signal aspects will begin, to sequentially communicate said each of said plurality of bytes of information from said third communication interface and sequentially write each of said plurality of bytes of information to the second port of said first dual port memory, to confirm to said first central processing unit core that writes to the second port of said first dual port memory have completed, and to indicate to said third communication interface that communication of said second number of track signal aspects has completed.

16. The cab signal apparatus of claim 13 wherein said third communication interface is structured to electrically isolate said first sub-system from said second sub-system.

17. The cab signal apparatus of claim 7 wherein said first communication interface comprises a dual port memory having a first port and a second port; wherein the first port of said dual port memory is accessible by said first central processing unit core; wherein the portion of the first function is further structured to control said dual port memory, to read said first number of track signal aspects from the second port of said dual port memory, and to serially communicate said first number of track signal aspects to said first device external to said cab signal apparatus.

18. The cab signal apparatus of claim 17 wherein the portion of the first function is further structured to provide a serial peripheral slave interface when serially communicating said first number of track signal aspects to said first device external to said cab signal apparatus; and wherein said first device external to said cab signal apparatus is a serial peripheral master interface.

19. The cab signal apparatus of claim 17 wherein the portion of the first function is further structured to indicate to said first central processing unit core that an access to the second port of said dual port memory is in progress; and wherein said first central processing unit core is further programmed to inhibit accesses to the first port of said dual port memory when said access to the second port of said dual port memory is in progress.

20. The cab signal apparatus of claim 17 wherein serial communications of said first number of track signal aspects to said first device external to said cab signal apparatus include a serial message having a header and a plurality of data bytes; wherein one access to the first port of said dual port memory by said first central processing unit core occurs during a first time; wherein serial communication of said header occurs during a second time which is longer than said first time; wherein an access to the second port of said dual port memory can begin during said first time; and wherein after said first time, the portion of the first function is further structured to prohibit a subsequent access to the first port of said dual port memory by said first central processing unit before said access to the second port of said dual port memory is completed.

21. The cab signal apparatus of claim 7 wherein said first central processing unit core is further programmed to compare said first number of track signal aspects from said first central processing unit core to said second number of track signal aspects from said second central processing unit core, and to select the more restrictive of said first number of track signal aspects and said second number of track signal aspects; and wherein said first communication interface is structured to communicate said more restrictive of said first number of track signal aspects and said second number of track signal aspects to said first device external to said cab signal apparatus.

22. The cab signal apparatus of claim 21 wherein said second central processing unit core is further programmed to compare said first number of track signal aspects from said first central processing unit core to said second number of track signal aspects from said second central processing unit core, and to select the more restrictive of said first number of track signal aspects and said second number of track signal aspects; and wherein said second communication interface is structured to communicate from said second central processing unit core the last said more restrictive of said first number of track signal aspects and said second number of track signal aspects to said second device external to said cab signal apparatus.

23. The cab signal apparatus of claim 22 wherein said first central processing unit core is further programmed to identify a first mismatch when said first number of track signal aspects from said first central processing unit core does not match said second number of track signal aspects from said second central processing unit core; wherein said first communication interface is further structured to communicate said first mismatch to said first device external to said cab signal apparatus; wherein said second central processing unit core is further programmed to identify a second mismatch when said first number of track signal aspects from said first central processing unit core does not match said second number of track signal aspects from said second central processing unit core; and wherein said second communication interface is further structured to communicate said second mismatch to said second device external to said cab signal apparatus.

24. The cab signal apparatus of claim 23 wherein said first device external to said cab signal apparatus is a first serial peripheral interface master of a vital automatic train positioning system; and wherein said second device external to said cab signal apparatus is a second serial peripheral interface master of said vital automatic train positioning system.

25. The cab signal apparatus of claim 22 wherein said first device external to said cab signal apparatus is a first serial peripheral interface master of a vital automatic train positioning system; and wherein said second device external to said cab signal apparatus is a second serial peripheral interface master of said vital automatic train positioning system.

26. The cab signal apparatus of claim 7 wherein said first central processing unit core and said second central processing unit core both include a digital signal processor.

* * * * *

UNITED STATES PATENT AND TRADEMARK OFFICE
CERTIFICATE OF CORRECTION

PATENT NO. : 7,850,127 B2  Page 1 of 1
APPLICATION NO. : 12/131381
DATED : December 14, 2010
INVENTOR(S) : John E. Lemonovich et al.

It is certified that error appears in the above-identified patent and that said Letters Patent is hereby corrected as shown below:

Column 6, line 24, "Intel®)" should read --Intel®)--.
Column 6, line 26, "AMD®)." should read --AMD®).--.
Column 8, line 4, "$V_{RMS}$" should read --$V_{RMS}$--.
Column 11, line 62, "NIOS®" should read --NIOS®--.
Column 14, line 66, "U.S. Pat. No. 5,711," should read --U.S. Pat. No. 5,711,497,--.
Column 14, line 67, "497, which" should read --which--.
Column 15, line 36, "Altera®" should read --Altera®--.
Column 19, line 53, "Nios®" should read --Nios®--.
Column 21, line 65, "signal data_s-" should read --signal data_- --.
Column 21, line 66, "trobe_syncd" should read --strobe_syncd--.
Column 28, line 5, "$V_{RMS}$" should read --$V_{RMS}$--.
Column 28, line 31, "phw_d-" should read --phw_- --.
Column 28, line 32, "out 306" should read --dout 306--.

Signed and Sealed this
Fifth Day of June, 2012

David J. Kappos
*Director of the United States Patent and Trademark Office*